United States Patent [19]

Rapkin

[11] B 4,008,393
[45] Feb. 15, 1977

[54] SYSTEM AND METHOD OF LIQUID SCINTILLATION COUNTING
[75] Inventor: Edward Rapkin, Short Hills, N.J.
[73] Assignee: Intertechnique S.A., Plaisir, France
[22] Filed: Sept. 11, 1970
[21] Appl. No.: 71,613
[44] Published under the second Trial Voluntary Protest Program on March 16, 1976 as document No. B 71,613.
[52] U.S. Cl. .......................... 250/328; 23/230 PC; 23/253 PC
[51] Int. Cl.² .......................................... G01T 1/00
[58] Field of Search ..... 250/106 SC, 106 T, 83 SA, 250/71.5 R, 328, 361; 23/230 PC, 253 PC

[56] References Cited
UNITED STATES PATENTS

| | | | |
|---|---|---|---|
| 2,961,541 | 11/1960 | Ruderman | 250/71.5 R |
| 3,188,468 | 6/1965 | Packard | 250/106 SC X |
| 3,571,596 | 3/1971 | Frank | 250/106 SC |
| 3,574,064 | 4/1971 | Binnings | 250/106 SC X |
| 3,604,935 | 9/1971 | Nather | 250/328 |
| 3,728,084 | 4/1973 | Hulsen | 250/328 UX |
| 3,797,999 | 3/1974 | Witz et al. | 250/361 C X |

FOREIGN PATENTS OR APPLICATIONS 1,573,284   7/1969   France ............................ 250/106 T

*Primary Examiner*—Davis L. Willis
*Attorney, Agent, or Firm*—Lane, Aitken, Dunner & Ziems

[57] ABSTRACT

A method of liquid scintillation counting utilizing a combustion step to overcome quenching effects comprises novel features of automatic sequential introduction of samples into a combustion zone and automatic sequential collection and delivery of combustion products into a counting zone.

37 Claims, 13 Drawing Figures

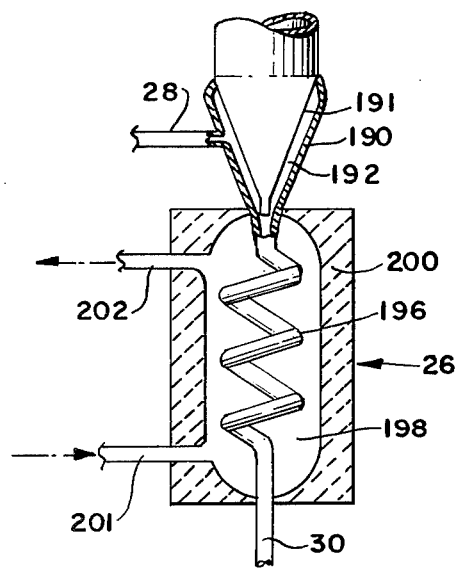
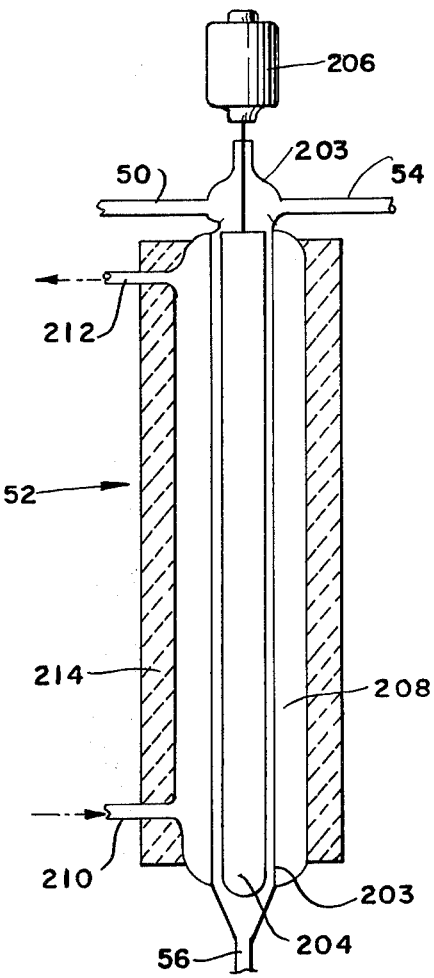
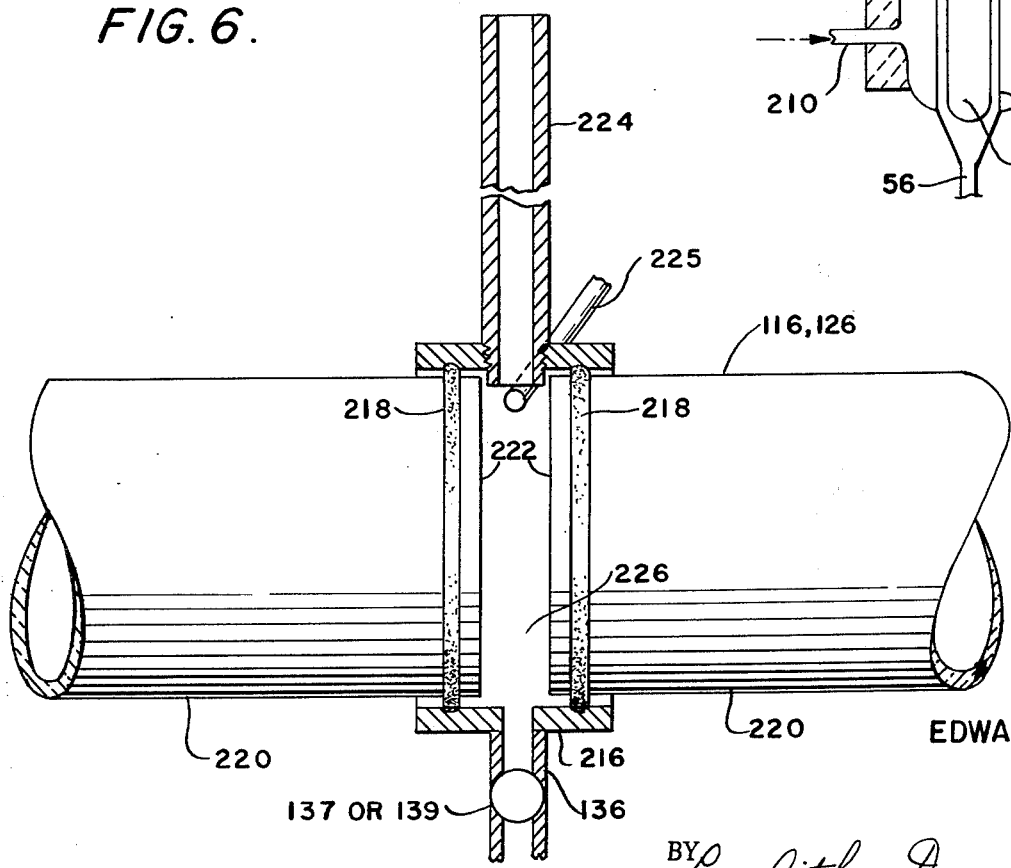

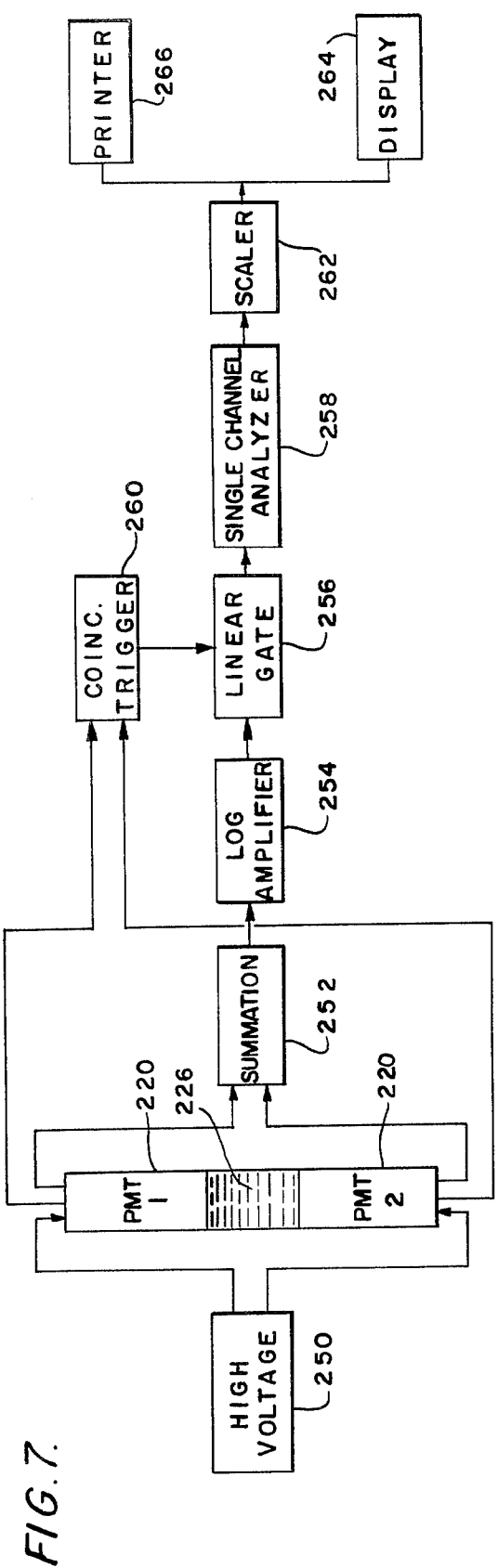

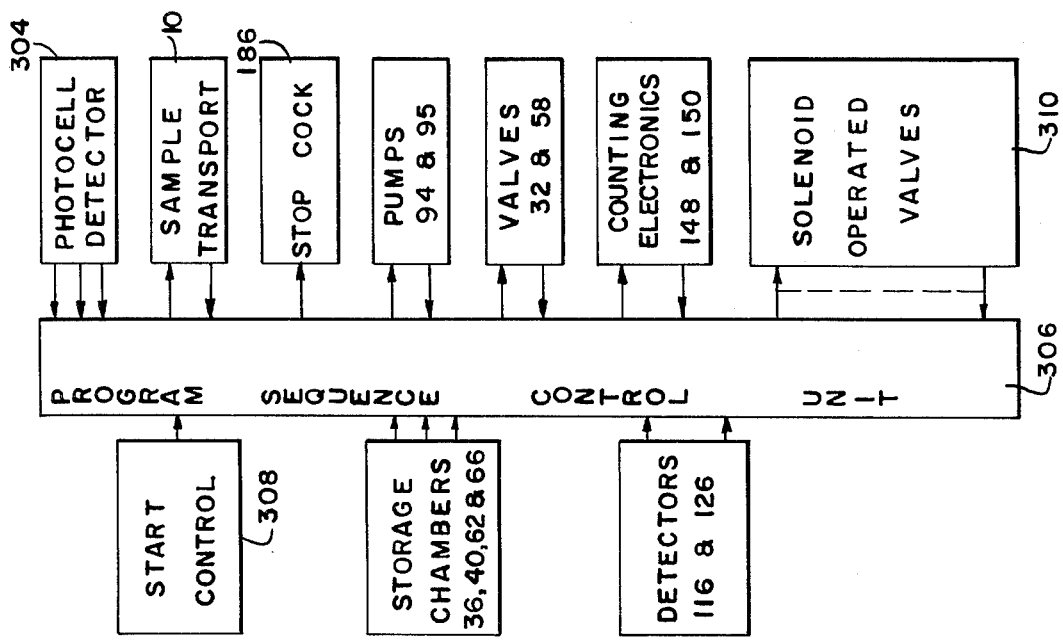
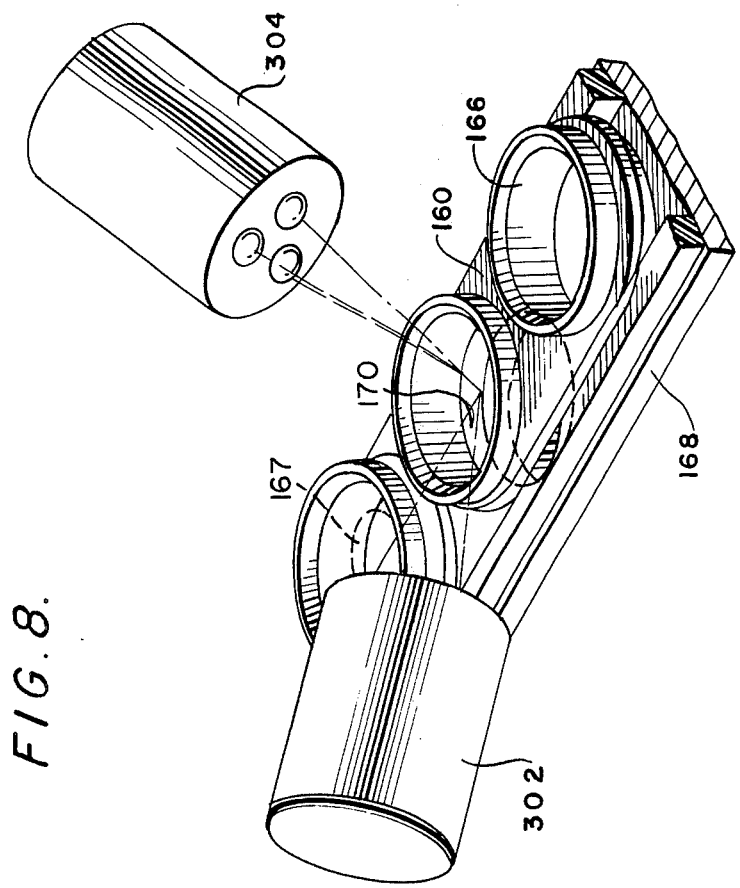

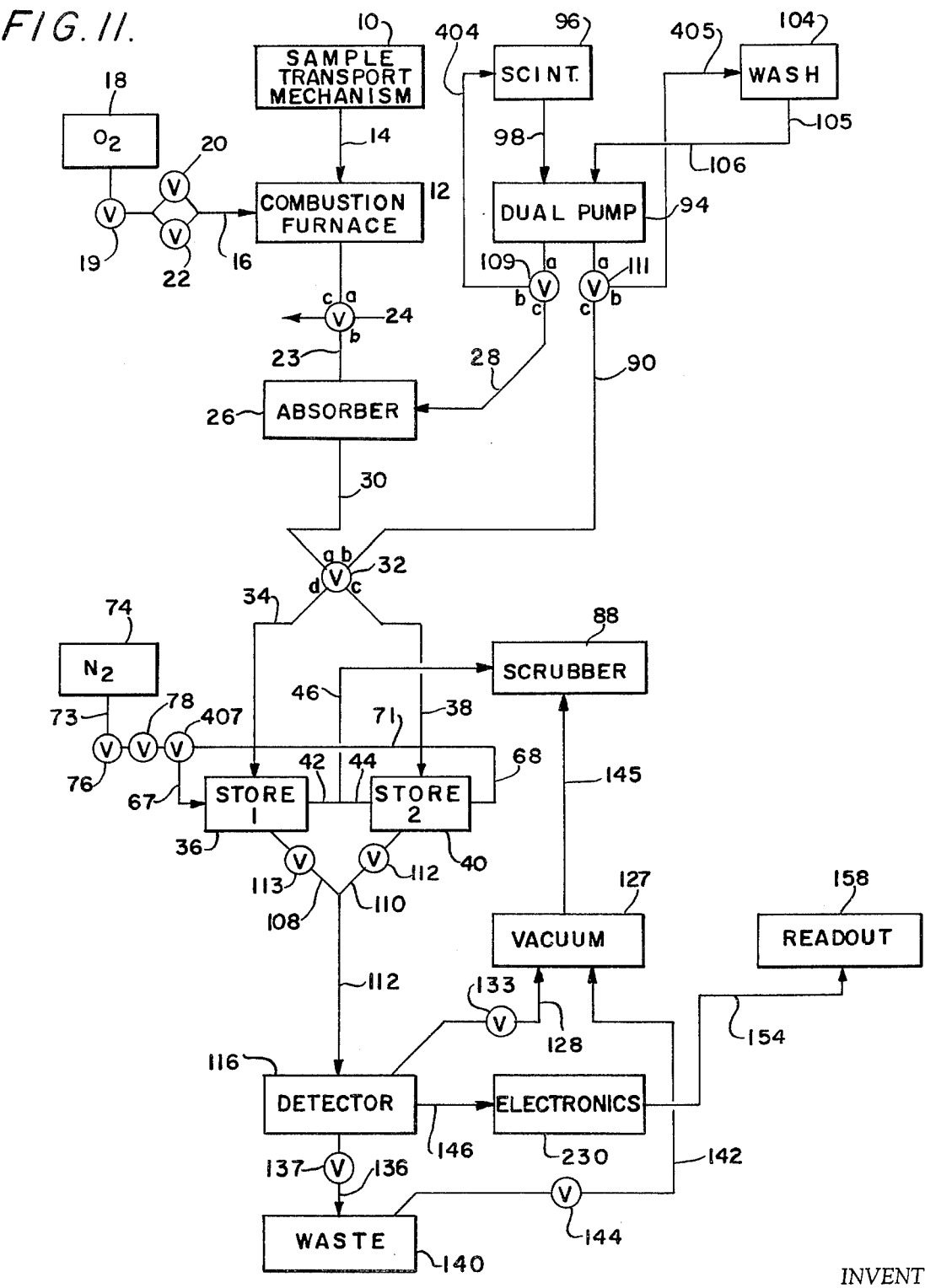

SYSTEM AND METHOD OF LIQUID SCINTILLATION COUNTING

BACKGROUND OF THE INVENTION

The present invention is directed to the field of liquid scintillation counting.

Liquid scintillation counting is a method for measuring radioactivity of samples. The method is usually used to analyze beta activity and sometimes alpha, positron, or low energy gamma activity.

In usual practice, the samples of radioactive material to be analyzed are placed in vials containing a liquid scintillator. A vial containing the radioactive material, sometimes called the "test substance", and the liquid scintillator is referred to as a "test sample." The liquid scintillator converts the radioactive decay events emanating from the radioactive material in the test sample into light flashes having intensities corresponding to the energies of the decay events. The light flashes are converted by a photomultiplier tube into pulses corresponding to the intensities of the light flashes. The resulting pulses are applied to pulse height analyzers which only pass pulses falling in selected amplitude ranges, each analyzer being set to pass a different range of amplitudes. Each selected amplitude range is referred to as a "counting channel." The pulse rates in each counting channel are measured by the determination of the number of pulses occurring during predetermined time intervals. This process of analyzing test samples is referred to as "counting the test samples." The pulse rate determined provides an indication of the rate at which decay events are occurring in the test sample in the energy ranges corresponding to the amplitude ranges of the pulse height analyzer. This information can then be used to indicate the concentration of radioactive isotopes in the samples.

Because of chemical and light transmitting properties of the test samples, the intensity of the light flashes which reach the photomultiplier tube frequently do not correspond to the energy level of the decay events causing the light scintillation, but actually may be substantially reduced in intensity. This reduction in intensity in the light scintillations is a phenomenon known as "quenching." The amount of quenching, that is, the degree of intensity reduction, varies from test sample to test sample. The quenching results in the pulse rates detected in the different channels not being an actual reflection of the rate of decay events in the corresponding energy ranges.

The problem of quenching has been met by the use of various standardization methods. In these methods, the amount of quenching in each test sample is measured and the resulting measurement is utilized to convert the pulse rate detected in each channel to reflect the actual rate of occurrence of decay events in the corresponding energy ranges.

One commonly used method of standardization is referred to as the "internal standard method." This method involves counting the sample and then recounting after the addition of a known quantity of a standard radioactive material generally of the same isotope. The initial counting results are then adjusted by the use of calibrations derived from comparison of the added performance of the standard as measured with what said added performance should actually be.

Another standardization method is referred to as the "external standard method." In this method the sample is first counted alone. Then the sample is counted in the presence of an externally positioned gamma source which is the external standard. The pulse rate which would be caused in one of the channels of the system by the standard in a test sample without quenching is known. Accordingly, the degree that the pulse rate caused by the external standard in this channel is below the rate which the standard would cause in a sample with no quenching is an indication of the level of quenching in the test sample. Once this level of quenching in the test sample is determined, the first count can be adjusted to reflect the actual rate of occurrence of decay events in the corresponding energy ranges.

Another method of standardization is referred to as the "channel ratio method." In this method the ratio of counts in two dissimilarly set counting channels is determined. The sample is then evaluated by comparison of its ratio to standard curves obtained from known samples with varying degrees of quenching.

In the aforementioned methods, standardization techniques are utilized to provide calibrations whereby the actual rate of occurrence of decay events can be determined. Such actual rate can be determined more easily after the elimination of quenching effects. One method of eliminating or substantially reducing quenching effects is known as the "sample combustion method." This method is limited to materials which have volatile combustion products such as the isotopes $^3H$, $^{14}C$, $^{32}P$, and $^{35}S$.

In a typical sample combustion method, for example, as described in Belgian Pat. No. 715,254 or in French Pat. No. 1,573,284, the test substance is manually introduced into a combustion zone. The combustion products are collected in liquid scintillator in conventional counting vials. The vials are then manually brought to the automatic liquid scintillation counting system. This method has the disadvantage of including a number of manual steps.

A further advantage of the combustion technique is that certain volatile oxides are easily separated from one another by physical or chemical means, usually through use of cooling and/or selective absorbing agents. Such separation may permit the collection of samples originating from test substances containing more than one radioactive isotope, for example $^3H$ and $^{14}C$, which samples have essentially only one of the two said isotopes, with almost no contamination from the other. Thereby, each sample may be counted under the best conditions for examining the contained isotope without the need for compromise operation to minimize the effect of the presence of the second isotope. Such complete isotope separation has not previously been attainable by the more conventional technique of dissolution or suspension of an unaltered or only slightly modified test substance in scintillator solution and counting.

It is an object of the present invention to provide a liquid scintillation counting technique utilizing a combustion step to overcome quenching effects and to permit chemical separation of $^3H$ and $^{14}C$ wherein manual steps are eliminated. A second object of the present invention is to eliminate the use of the conventional counting vial thereby resulting in substantially improved counting performance.

Summary of the Invention

The above objects are achieved by the provision of a liquid scintillation counting system comprising (a) a combustion chamber for combusting radioactive samples; (b) means sequentially conveying said radioactive samples to said combustion chamber so that each sample enters said chamber only provided that the chamber is ready for a new sample; (c) means for collecting from said combustion chamber combustion product resulting from the combustion of each test substance and retaining said product in a liquid scintillator to provide at least one test sample corresponding to each radioactive test substance combusted; and (d) a detecting chamber communicating with said collecting means, receiving and counting said test samples. The combustion chamber is ready for a new radioactive sample when the combustion products from the most recent combustion have been exhausted from said chamber. The operation of any of the elements (a) – (c) can be automatically triggered by a signal generated by a downstream element indicating that the next downstream element is ready to receive material from a directly previous element. Alternatively, the operation of any one of the elements (a) – (c) can be automatically triggered by a programmed time control. The operation of element (d) can be automatically triggered by the completion of counting.

With the aforementioned system each radioactive test substance is in turn conveyed to a combustion chamber. The conveying is automatically controlled so that only one radioactive test substance is in the combustion chamber at any point in time. Almost immediately after it has been combusted, the combustion chamber is completely exhausted of combustion products which are collected by the use of trapping agents which can be or can contain a liquid scintillator. The particular trapping agent chosen depends upon the isotope oxide to be counted. The isotope oxide-trapping agent-liquid scintillator combination is denoted a "test sample." This test sample in liquid state is fed into the detecting chamber which communicates with the collecting means. In the detecting chamber the test sample is counted. As soon as the combustion chamber has been exhausted of combustion products, it is capable of combusting a new radioactive test substance. In like manner, as soon as a collecting and trapping means is exhausted of its test sample, it can be used for collecting the combustion products derived from the combustion of the next radioactive sample. Similarly, when the counting of a test sample in the detecting chamber has been completed, that test sample is removed from the detecting chamber, for example, to waste, and a new test sample can be fed into said detecting chamber for counting. Thus the samples and their combustion products are sequentially moved through the system. This sequential operation is carried out automatically according to a programmed time control or preferably in accordance with logic signals generated by the termination of one of the steps, for example, by the termination of counting.

BRIEF DESCRIPTION OF THE DRAWINGS

FIG. 4 is an elevational view partly in vertical cross-section of a tritium oxide collecting means preferred for use in the system of the invention.

FIG. 5 is a view taken in vertical cross-section of a $^{14}CO_2$ collecting means preferred for use in the system of the invention.

FIG. 6 is a longitudinal view partly in vertical section of a detecting chamber useful within the scope of the invention.

FIG. 7 is a simplified block diagram of electronics suitable to process the output from either one of the detectors of the liquid scintillation counting system of FIG. 1.

FIG. 8 schematically illustrates the photoelectric system used to detect the approach of a sample to the combustion furnace of the system and the type of sample approaching.

FIG. 9 is a block diagram illustrating the electronics for automatically controlling the system of FIG. 1.

FIG. 11 is a simplified block diagram of components of a simplified liquid counting system according to the invention.

FIG. 12 is a simplified block diagram of electronics suitable to process the output from the detector in the liquid scintillation counting system of FIG. 11.

DETAILED DESCRIPTION OF THE INVENTION

The invention herein is described with respect to a system and method for measuring the radioactivity of the radioactive isotopes of hydrogen and/or carbon, that is, tritium ($^3H$) and/or carbon-14($^{14}C$). It should be borne in mind that the present invention can also be utilized to measure the radioactivity of isotopes of phosphorus and sulfur, that is, phosphorus-32($^{32}P$) and sulfur-35($^{35}S$) and of other isotopes with adjustment to the system and method.

Figure 1:
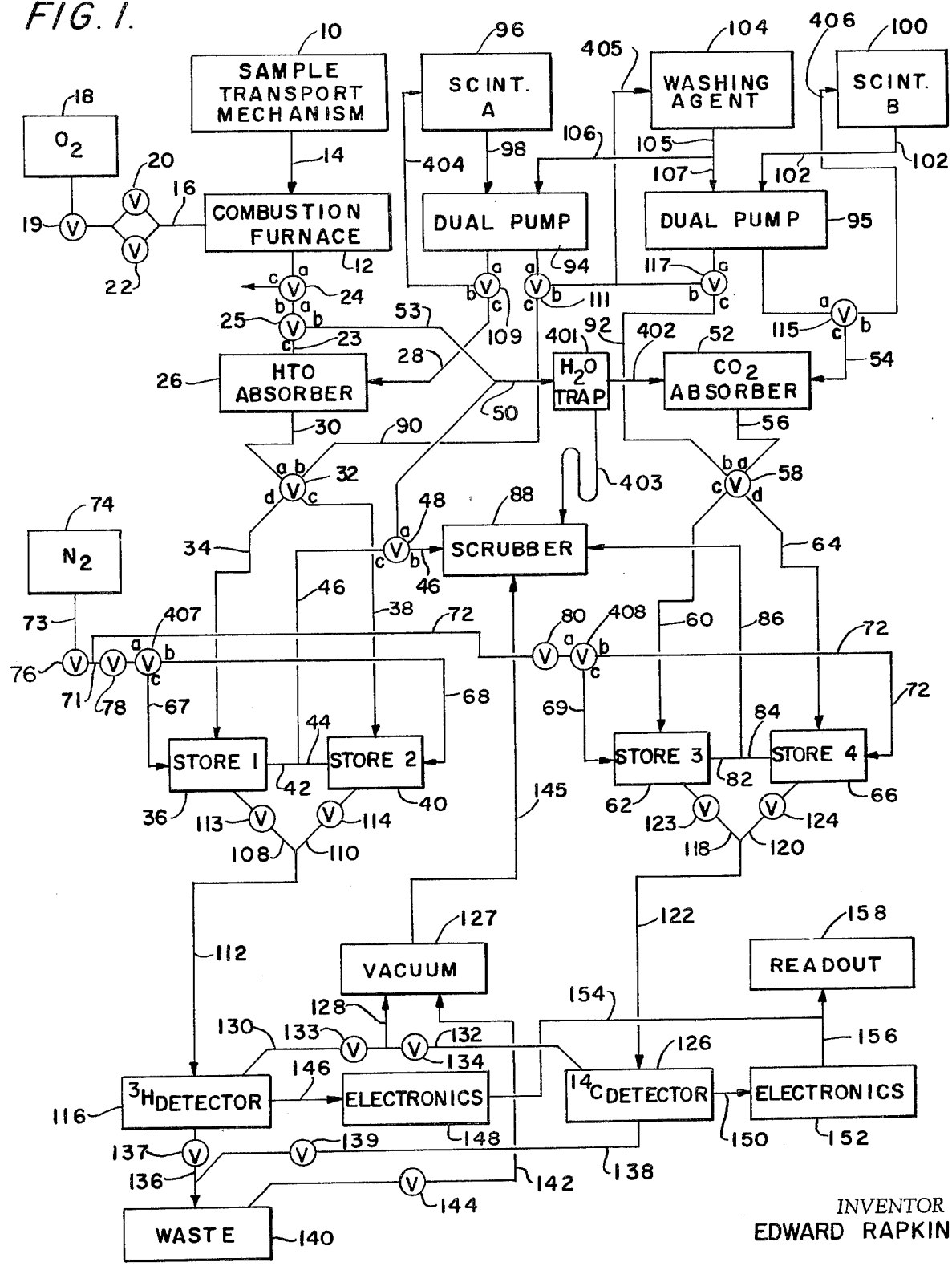
FIG. 1 is a simplified block diagram of components of a liquid scintillation counting system according to the invention.

Referring to FIG. 1, there is illustrated a liquid scintillation counting system within the scope of the present invention. This counting system contains elements providing a combustion step to overcome quenching effects.

The system comprises a sample transport mechanism 10. Sample transport mechanism 10 handles several hundred samples of radioactive material, for example, 400 samples spaced from one another so as to successively transport each individual sample to a predetermined point.

This predetermined point is opposite or in communication with an entrance to a combustion furnace 12. Combustion furnace 12 is provided with inlets through which samples and oxygen are fed into said furnace and an outlet for the removal of combustion products. Combustion furnace 12 is heated externally, preferably by an electrical heating element; preferred operating temperature is in the range of 600°–800°C. The furnace is constructed of suitable refractory material such as stainless steel or quartz. Preferably, a portion of it is packed with oxidation catalyst.

When each sample reaches said predetermined point, it is fed into combustion furnace 12 as denoted by arrow 14. Oxygen is supplied to combustion furnace 12 via a line 16 which communicates with a source of oxygen 18 such a cylinder containing oxygen under pressure. Oxygen supply line 16 is provided with pressure reducing valves 19 and 22 and with a 2-way solenoid operated valve 20.

Under the influence of heat provided by the aforementioned heating element and under the influence of the oxidation catalyst, if used, a sample having been fed into combustion furnace 12 is converted by the oxygen feed into combustion product comprising oxides of the elements present in said sample. Such oxides may include, for example, hydrogen tritium oxide (HTO) and/or $^{14}CO_2$ if radioactivity in the form of $^3H$ and/or $^{14}C$ is present within the sample substance subjected to combustion. Combustion furnace 12 is sealed from the external environment during combustion in order to ensure high oxygen concentration and also so that radioactivity present in the volatile combustion products may be collected without loss. During and after combustion, combustion product is forced by the inflowing oxygen out of combustion furance 12.

Valve 19 is provided to reduce the pressure on the oxygen from the pressure level in source 18 so as to provide oxygen emanating from valve 19 at the flow rate that the oxygen is to be supplied into combustion furnace 12 during combustion and subsequent combustion product collection. This flow rate is denoted an operating rate. The opening in valve 19 is set upon installation of oxygen source 18 and is not reset until source 18 is replaced. Valve 22 is provided with a fixed setting so as to allow oxygen to pass through it to provide a flow rate of oxygen on its output side which is substantially reduced compared to said operating rate. This reduced rate can be, for example, 20% of said operating rate, and is denoted a standby rate. More particularly, when a new sample is being fed into combustion furnace 12, valve 20 opens providing oxygen flow into said furnace at said operating rate. At the time combustion product is completely removed from combustion furnace 12, valve 20 closes whereby oxygen is provided only through valve 22 and is fed into furnace 12 at said standby rate.

Only one radioactive sample including combustion product therefrom is present in combustion furnace 12 at any point in time. This is effected by sequential feeding of samples by sample transport mechanism 10, with a new sample being added automatically into combustion furnace 12 only when or after combustion product from the previous sample has been completely removed from said furnace.

Communicating with the outlet of combustion furnace 12 is a line 23 which has an outlet into an HTO absorber 26. Line 23 contains 3-way solenoid operated valves 24 and 25.

Valve 24 is provided so that oxygen which is fed into combustion furnace 12 can be vented to the atmosphere when a sample is not being combusted. To effect said venting, valve 24 opens from $a$ in the direction of $c$. Valve 24 is switched to open from $a$ in the direction of $b$ when a sample is fed into the furnace and switches back to open from $a$ in the direction of $c$ when valve 20 closes at the end of combustion of a sample.

Valve 25 is provided so that HTO absorber 26 can be bypassed when only $^{14}CO_2$ is to be counted. Said bypassing is effected when valve 25 is open from $a$ in the direction of $b$. If bypassing is not desired, valve 25 is maintained open from $a$ in the direction of $c$. The operation of the system when only $^{14}CO_2$ is to be counted is described in detail hereinafter.

If HTO is to be counted, the combustion product emanating from furnace 12 is directed through line 23 with valve 24 open from $a$ in the direction of $b$ and valve 25 open from $a$ in the direction of $c$ into the HTO absorber 26. Also fed into HTO absorber 26 is a liquid scintillator denoted "Scintillator A." This scintillator has a composition favoring the trapping, that is the absorption, of water but not of carbon dioxide. It also has a composition favoring the counting of HTO. Scintillator A is fed into absorber 26 via a feed line 28.

In absorber 26 the combustion product is intimately mixed with said scintillator whereby the water vapor produced in said combustion product, including HTO if present, is absorbed and trapped in said scintillator to provide a first test sample, that is an HTO containing test sample.

This first test sample and residual gases comprising unabsorbed combustion product and excess oxygen are directed via a line 30 and an automatic 4-way solenoid operated valve 32 either via a line 34 to an intermediate storage chamber 36 denoted "Store 1" or alternatively via a line 38 to an intermediate storage chamber 40 denoted "Store 2." When the test sample and residual gases are to be directed to chamber 36, valve 32 opens from $a$ in the direction of $d$. When that material is to be directed to chamber 40, valve 32 opens from $a$ in the direction of $c$. The test sample and residual gases are directed by automatic valve 32 to whichever of chambers 36 and 40 is empty and has been rinsed as described hereinafter. If both chambers are in this condition, valve 32 may direct the test sample to either chamber.

Intermediate storage chambers 36 and 40 have gas vent lines 42 and 44 respectively. These vent lines both communicate with a main vent line 46 which contains an automatic 3-way solenoid operated valve 48. Valve 48 communicates with $CO_2$ absorber inlet line 50 which in turn communicates with a water trap 401 followed by line 402 and a $CO_2$ absorber 52. When a sample containing both $^3H$ and $^{14}C$ is delivered to the combustion chamber, valve 48, which normally opens from $c$ to $b$, switches automatically to open in the direction of line 50, that is from $c$ in the direction of $a$, whereby residual gases flow via lines 42 or 44 and 46 through valve 48, line 50, water trap 401, and line 402 into $CO_2$ absorber 52. The valve 48 remains in this position for about two minutes while the storage chambers 36 and 40 are being filled and then switches back to the normal condition in which it opens from $c$ to $b$.

Communicating between valve 25 in line 23 and line 50 is line 53. This line is provided so that HTO absorber 26 can be bypassed when only $^{14}CO_2$ is to be counted. The operation of this system when only $^{14}CO_2$ is to be counted is described in detail hereinafter.

Also fed into $CO_2$ absorber 52 when a sample containing $^{14}C$ is being combusted is a liquid scintillator denoted "Scintillator B." This scintillator has a composition favoring the trapping, that is the absorption, of $CO_2$. It also has a composition favoring the counting of $^{14}CO_2$. Scintillator B is fed into absorber 52 via a feed line 54.

In absorber 52 the gases fed via line 402 are intimately mixed with said scintillator whereby $^{14}CO_2$ in said gases is absorbed by and trapped in said scintillator to provide a second test sample, that is a $^{14}CO_2$ containing test sample.

This second test sample and any residual and dissolved gases are directed via a line 56 and an automatic 4-way solenoid operated valve 58 either via a line 60 to an intermediate storage chamber 62 denoted "Store 3" or alternatively via a line 64 to an intermediate storage chamber 66 denoted "Store 4." When the material is to be directed to chamber 62, valve 58 opens from $a$ in the direction of $c$. When the material is to be directed to chamber 66, valve 58 opens from $a$ in the direction of $d$. The test sample and residual gas are directed by automatic valve 58 to whichever of chambers 62 and 66 is empty and has been rinsed as described hereinafter. If both chambers are in this condition, valve 58 may direct the test sample to either chamber.

Purging of scintillator solutions is employed to eliminate or reduce the dissolved oxygen content in order to improve subsequent counting performance.

Each of storage chambers 36, 40, 62 and 66 respectively communicates with a nitrogen supply line 67, 68, 69 and 70. Each of lines 67 and 68 originates from one outlet of 3-way valve 407 whose operation, as subsequently described, is such as to direct nitrogen purge gas to that intermediate storage chamber of chambers 36 and 40 which may have been filled with scintillator solution from the most recent combustion. Similarly, each of lines 69 and 70 originates from one outlet of 3-way valve 408 the operation of which, as subsequently described, is such as to direct nitrogen purge gas to that intermediate storage chamber of chambers 62 and 66 which may have been filled with scintillator solution from the most recent combustion. Branch lines 71 and 72 extend from main nitrogen supply line 73 which in turn communicates with a source of nitrogen 74. This nitrogen source can be, for example, a cylinder containing nitrogen under pressure.

Main nitrogen supply line 73 contains a pressure reducing valve 76 which reduces the pressure on the nitrogen from the pressure level in source 74 so as to provide a desired nitrogen operating flow rate downstream of valve 76. The opening in valve 76 is set upon installation of nitrogen source 74 and is not reset until source 74 is replaced.

Branch nitrogen supply line 71 is provided with an automatic 2-way solenoid operated valve 78 which is positioned upstream of valve 407. Branch nitrogen supply line 72 is provided with an automatic 2-way solenoid operated valve 80 which is positioned upstream of valve 408.

Storage chambers 62 and 66 each respectively communicates with a gas vent line 82 and 84. These vent lines both communicate with a main vent line 86. Main vent line 86 and also main vent line 46 previously described communicate with a scrubber 88. Scrubber 88 communicates with line 46 downstream of valve 48. Scrubber 88 can comprise a vertical tube packed with glass or porcelain rings through which water is slowly trickled and then disposed to waste.

When a sample containing both $^{14}C$ and $^{3}H$ is fed to combustion furnace 12, valves 78 and 80 open. Each remains open for a fixed period of time. Since the two scintillator solutions employed have different compositions, it is likely that their dissolved oxygen contents are different. Therefore, the fixed period for purging can be different for each solution and valves 78 and 80 could operate for different periods of time. However, in reality the difference between the two solutions, in terms of dissolved oxygen content, is slight and therefore it simplifies instrument design to operate both valves for the same period which is sufficient to deoxygenate that solution with the greater oxygen content.

During the time that the HTO-containing test sample is being filled into one of the storage chambers 36 or 40, the total period corresponding to the period that valve 48 is open in the direction of line 50, that is from $c$ in the direction of $a$, the nitrogen flowing into chambers 36 and 40 as a result of valve 78 being open serves the function of sweeping all gases from these chambers into $CO_2$ absorber 52.

As noted above, the principal function of the nitrogen flow into chambers 36, 40, 62 and 70 is to purge from a collected test sample dissolved oxygen thereby reducing oxygen quenching. The purge gas carries the oxygen dissolved in a test sample and some solvent vapors (solvent is present in the scintillator and in the washing agent described hereinafter) out of the chambers 36, 40, 62 and 66 via vent lines 42, 44, 82 and 84 respectively. The exiting streams from storage chambers 62 and 66 are directed via main vent line 86 into scrubber 88 wherein solvent vapors are absorbed whereby fire hazard is eliminated. When valve 48 switches back to its normal condition when the storage chambers become filled, the exiting streams from chambers 36 and 40 are directed into the scrubber 88.

Two intermediate storage chambers are provided for each of the absorbers so that one of said chambers can be utilized to store a test sample while the other chamber is washed or rinsed to remove radioactivity remaining from a test sample previously inhabiting that chamber. This washing is carried out, for example, with toluene, a solvent.

To facilitate this washing, wash lines 90 and 92 are provided. Wash line 90 communicates with chambers 36 and 40 via valve 32 and lines 34 and 38. Wash line 92 communicates with chambers 62 and 66 via valve 58 and lines 60 and 64. Valves 32 and 58 operate automatically to fill washing agent into a storage chamber after that chamber has been emptied of a test sample.

Washing agent is filled into chamber 36 at the same time that a test sample is filled into chamber 40, and washing agent is filled into chamber 40 at the same time a test sample is filled into chamber 36. Washing agent is filled into chamber 62 at the same time that a test sample is filled into chamber 66, and washing agent is filled into chamber 66 at the same time that a test sample is filled into chamber 62. Thus, valve 32 opens either (1) from $a$ in the direction of $d$ and also from $b$ in the direction of $c$ or else (2) from $a$ in the direction of $c$ and also from $b$ in the direction of $d$, alternately with the combustion of each sample. In like manner, valve 58 opens either (1) from $b$ in the direction of $c$ and also from $a$ in the direction of $d$ or else (2) from $b$ in the direction of $d$ and also from $a$ in the direction of $c$, alternately with the combustion of each sample.

The scintillator streams introduced via lines 28 and 54 and the wash streams introduced via lines 90 and 92 are fed by the use of "dual pumps" 94 and 95. Dual pump 94 communicates with lines 28 and 90. Dual pump 95 communicates with lines 54 and 92. The dual pumps 94 and 95 each comprise one motor driving two glass or teflon syringes. Each syringe contains a ball check which allows such syringe to fill from a reservoir when the plunger is withdrawn and empty into a tube when the plunger is depressed. Suitable syringes have a volume of, for example, about 25 cc. The stroke of each syringe suitably has, for example, a volume of about 20 cc., and that stroke can be accomplished in, for example, about 2 minutes. The volume of the chambers 36, 40, 62 and 66 correspond with the stroke volume of the syringes so that the chambers are filled with one stroke. Each dual pump preferably delivers two streams, that is one scintillator stream and one washing agent stream, simultaneously. Two independent pumps can be substituted for each dual pump.

Scintillator A is supplied to one syringe of dual pump 94 from a reservoir 96 via a feed line 98. Scintillator B is supplied to one syringe of dual pump 95 from a reservoir 100 via a feed line 102. Washing agent is supplied from a reservoir 104 via main feed line 105 and branch lines 106 and 107 to the other syringes of dual pumps 94 and 95, line 106 communicating with a syringe of pump 94 and line 107 communicating with a syringe of pump 95.

Solenoid operated valves 109 and 111 are located in the exit lines 28 and 90 of the dual pump 94 and can be selectively operated to direct the scintillator and wash streams back through lines 404 and 405 respectively to the reservoirs 96 and 104 from which they originated instead of to the HTO absorber 26 and to valve 32. Similarly, solenoid operated valves 115 and 117 are located in the exit lines 54 and 92 of the dual pump 95 and can be selectively operated to direct the wash and scintillator streams back through lines 406 and 405 respectively to the reservoirs 100 and 104 from which they originated instead of to the valve 58 nd the $CO_2$ absorber 52. When the valves 109 and 115 open in the direction from $a$ to $c$, they direct the scintillator streams to the absorbers 26 and 52 respectively and when these valves open in a direction from a to b they direct the scintillator streams back to the reservoirs from when they originated. When the valves 111 and 117 open in a direction from $a$ to $c$, they direct the wash streams to valves 32 and 58 respectively, and when these valves open in a direction from $a$ to $b$ they direct the wash streams back to their reservoir. This bypassing of the exit streams of the pumps back to the input thereof is used in the system at times when the pumps are operated but it is not desired to deliver either a wash stream or a scintillator stream or both to the storage chambers or absorbers which would otherwise receive the streams.

Communicating with chambers 36 and 40 respectively are exit lines 108 and 110. These exit lines each communicate at its downstream end with a single line 112 providing an inlet to a $^3H$ detector 116. The three lines 108, 110 and 112 are joined so as to form a Y configuration with each of the lines being one branch of said Y. Line 108 contains an automatic 2-way solenoid operated valve 113. Line 110 contains an automatic 2-way solenoid operated valve 114.

Communicating with chambers 62 and 66 respectively are exit lines 118 and 120. These exit lines each communicate at its downstream end with a single line 122 providing an inlet to a $^{14}C$ detector 126. The three lines 118, 120 and 122 are joined so as to form a Y configuration with each of the lines being one branch of the Y. Line 118 contains an automatic 2-way solenoid operated valve 123. Line 120 contains an automatic 2-way solenoid operated valve 124.

A source of vacuum 127 such as a rotary vacuum pump communicates with detecting chamber 116 via lines 128 and 130 and with detecting chamber 126 via lines 128 and 132. Lines 130 and 132 contain automatic 2-way solenoid operated valves 133 and 134 respectively.

Detector 116 is provided with an exit line 136. Detector 126 is provided with an exit line 138 which provides communication between detector 126 and line 136. Line 136 contains an automatic 2-way solenoid operated valve 137 upstream of the intersection of lines 136 and 138. Line 138 contains an automatic 2-way solenoid operated valve 139. Line 136 has an outlet into waste reservoir 140. Reservoir 140 communicates with vacuum source 127 via a line 142 which is provided with an automatic 2-way solenoid operated valve 144.

When detector 116 is ready for a test sample, whichever of valves 113 or 114 communicates with a storage chamber containing said test sample opens to provide access between said chamber and the detector. When said valve opens, valve 133 also opens. Thereupon the vacuum from source 127 initiates the action whereby said test sample is completely drawn into said detector. When said test sample has been filled into said detector whichever of valves 113 and 114 is open closes and also valve 133 closes. When these valves close, counting begins. Once the sample has been counted valves 137 and 144 open and action is initiated whereby said sample is completely drawn from detector 116 into waste reservoir 140.

Before a test sample is introduced into the detector 116 from one of the chambers 36 or 40, the washing agent from the other chamber is introduced to the detector and then withdrawn. Whichever of valves 113 or 114 communicates with a storage chamber containing washing agent opens to provide access between said chamber and the detector. Valve 133 also opens to intitiate action whereby washing agent is removed from a storage chamber and is drawn into said detector. When the detector has been filled with washing agent and said storage chambers empty of it, whichever of valves 113 and 114 is open closes and also valve 133 closes. After washing of said detector has been completed, valves 137 and 144 open and whereby action is initiated so that washing agent is drawn from said detector into reservoir 140. Then valves 137 and 144 close. Detector 116 will then be ready for the test sample.

Valves 113 and 114 open to admit a test sample or washing agent at the proper times in response to commands from a program sequence control unit described below and close after a fixed time interval when the storage chamber has been emptied. Valve 133 opens and closes together with valves 113 and 114. Valve 137 opens at the completion of the count or wash and closes after a fixed time when the detector 116 has been emptied. Valve 144 opens and closes together with valve 137 and/or 139 as described hereinafter.

When detector 126 is ready for a test sample, it is supplied with a test sample, counts the test sample and is washed in similar fashion to the way detector 116 is operated. Valves 123, 124, 134, 139 and 144 are utilized. Valves 123 and 124 open to admit a test sample or washing agent in response to commands from program sequence control unit and close after a fixed time interval. Valve 134 opens and closes together with valves 123 and 124. Valve 139 opens at the completion of the count or wash and closes after a fixed time period. Valve 144 opens and closes with valves 139 or 137; if either 137 or 139 is open, 144 is also open.

A vent line 145 extends from vacumm source 127 to scrubber 88 whereby solvent vapors removed from the system by the operation of vacuum source 127 are absorbed.

Detector 116 is electrically connected as denoted by arrow 146, to suitable electronics as denoted by 148. Detector 126 is electrically connected as denoted by arrow 150 to suitable electronics as denoted by 152. Said electronics are electrically connected as denoted by 154 and 156 to readout mechanism 158. Signals are fed through electrical connections 146 and 150 to electronics 148 and 152 whereby information is provided with respect to the radioactivity of the samples. The electronics and readout can be conventional and can include preamplifiers and amplifiers, a coincidence circuit, one or more single channel analyzers, and generally a scaler associated with each single channel analyzer.

For combustion and counting a sample containing only $^{14}C$, valve 25 is switched to open from $a$ in the direction of $b$ during combustion of each sample containing only $^{14}C$ whereby combustion product is directed to $CO_2$ absorber 52, and HTO absorber 26 is bypassed. Combustion products are directed through line 53 into $H_2O$ trap 401. Said trap which is best operated at reduced temperature by means of external cooling, serves to eliminate water vapor produced during combustion from the $^{14}CO_2$ counting mixture thereby enhancing counting efficiency and overcoming the necessity of using a composition for scintillator B capable of dissolving significant quantities of water. The water collected in trap 401 is periodically siphoned through line 403 into the scrubber 188, the design of the siphon being such that siphoning commences automatically upon accumulation of a sufficient quantity of water and that when such siphoning has been completed and the siphon action "breaks", a water seal remains in the $H_2O$ trap to prevent loss of gas through said siphon.

Since for counting $^{14}CO_2$ alone the absorber 26 is not used, the output of the pump 94 is not required except to complete any washing required from processing the preceding sample. Accordingly, valve 109 will be utilized to bypass the output of the pump 94 back to the input thereof and valve 111 will also be used to return the output of pump 94 back to the wash solution reservoir 104 unless a wash of intermediate storage chambers 36 or 40 is required according to requirements later described. Valve 78 is maintained in closed position to conserve nitrogen and valves 133 and 137 are maintained in closed position to prevent loss of vacuum through the part of the system not being used when a sample containing only $^{14}C$ is combusted and counted except to complete washing required from combustion of the preceding sample.

For counting $^3H$ alone, valve 25 is continuously open from $a$ in the direction of $c$ whereby combustion product is directed to HTO absorber 26. Valve 48 is continuously open from $c$ in the direction of $b$ whereby the purge gas is directed continuously to scrubber 88. Valve 80 is maintained closed and valves 134 and 139 are maintained closed except to complete washing required from combustion and counting of the preceding sample. The valves 115 and 117 are utilized to bypass the outputs from pump 95 back to the respective reservoirs 100 and 104.

Figure 3:
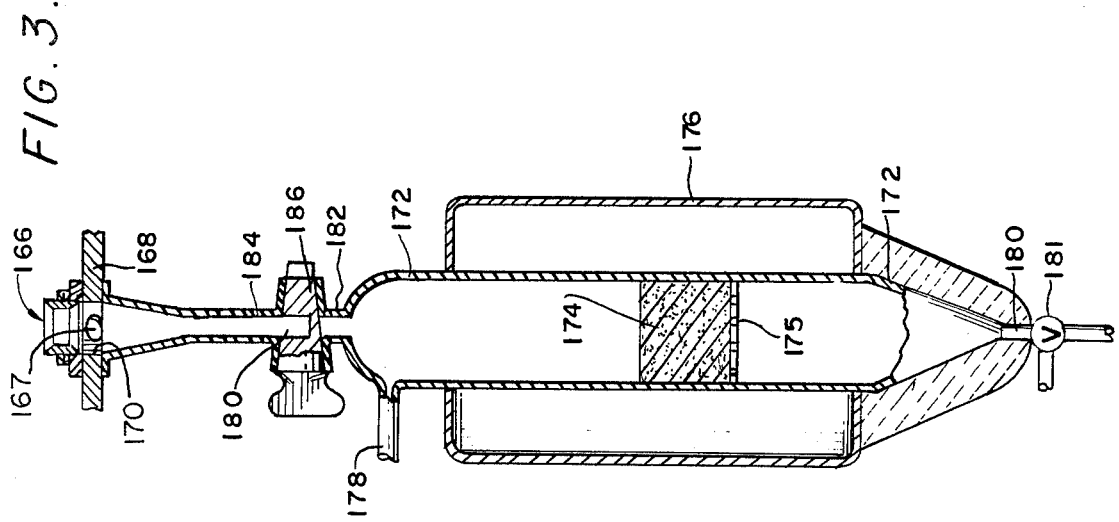
FIG. 3 is a vertical cross-sectional view taken along line 3—3 of FIG. 2.
Figure 2:
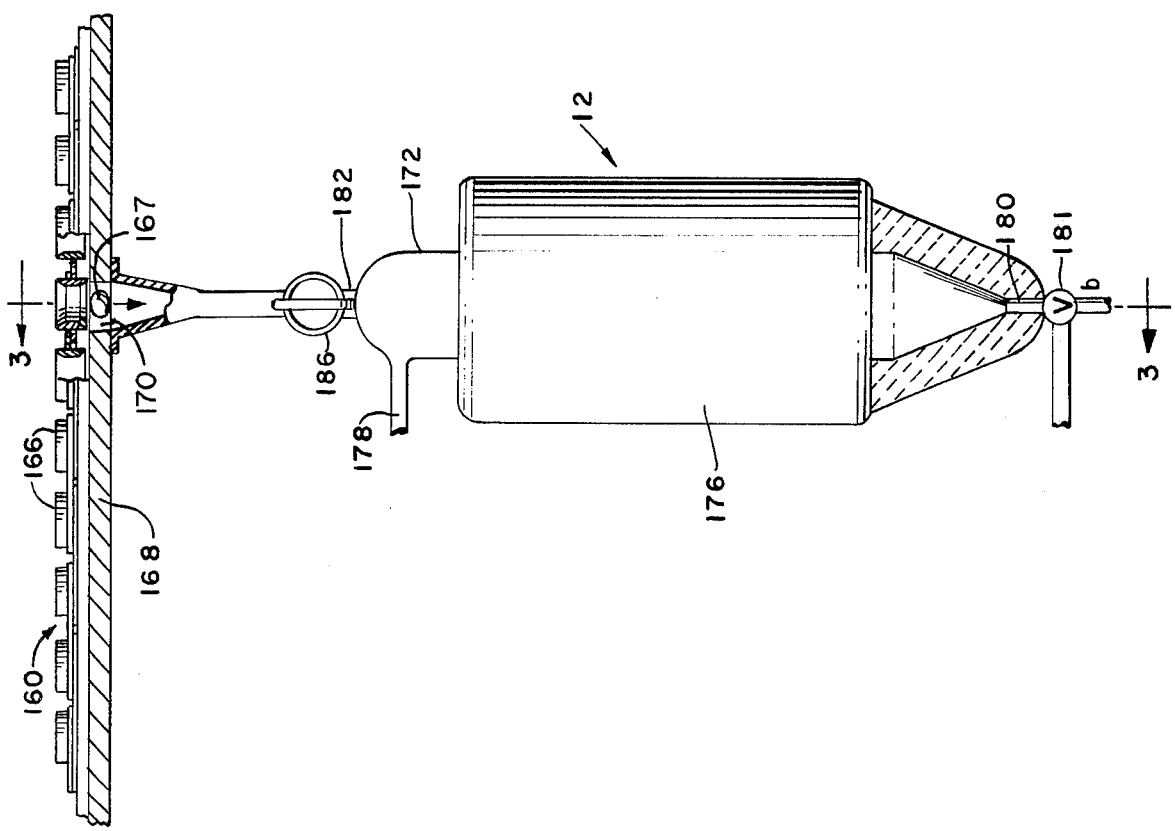
FIG. 2 is a longitudinal sectional view of a sample transport mechanism and a combustion furnace useful within the scope of the invention.

A preferred embodiment of sample transport mechanism 10 is depicted in FIGS. 2 and 3. With continuing reference to these figures, preferred sample transport 10 comprises a link chain 160 of the type disclosed in the patent to Meeder et al U.S. Pat. No. 3,206,006. Link chain 160 defines a series of compartments 166 each of which is of sufficient size to hold only a single sample 167. Link chain 160 is horizontally oriented. Each of the compartments 166 is open at the top and bottom. Link chain 160 is positioned directly above a solid flat plate 168 which is also horizontally oriented. The solid plate 168 contains a single aperture 170 which is sized so as to pass only a single sample. The aperture 170 is positioned above an entrance to the combustion furnace. A single radioactive sample 167 is placed in each compartment 166. The link chain 160 is trained in a serpentine orientation on several sprocket wheels as disclosed in the Meeder et al U.S. Pat. No. 3,206,006. Some of the sprocket wheels are driven by a motor so as to move link chain 160 relative to stationary solid plate 168 so as to sequentially convey each of samples 167 to aperture 170. When a radioactive sample 167 reaches aperture 170, it falls through said aperture and is delivered to the combustion furnace 12 positioned below. Chain 160 moves in response to a signal provided by the program sequence control unit, which signal is generated either at the start of counting a previously combusted sample or, if operation is just being initiated, in response to the depression of a start sequence pushbutton. The transport is controlled in a manner whereby empty compartments are passed by aperture 170 and so that link chain 160 is moved until a compartment 166 containing a radioactive sample is registered above aperture 170 so that a sample is fed on command to combustion furnace 12. This bypass procedure is achieved by means of a lamp and photocell detector so as to signal when the compartment 166 approaching the aperture 170 contains a radioactive sample. Each time the sample transport brings a compartment over the aperture 170, it trips a limit switch. The program sequence control stops the sample transport when the limit switch is tripped following detection of a sample by the photocell detector. Thus, the sample transport will advance until a compartment containing a sample comes over the aperture 170 whereupon the transport will stop.

Preferably, the radioactive samples are transported in sample transport mechanism 10, having been encapsulated within a combustible material, said encapsulation retaining said radioactive sample so that it can be transported. Most preferably the sample is entirely encapsulated. However, samples can also be contained in capsules having no tops. The encapsulating material is preferably composed only of the elements of carbon and hydrogen or carbon, hydrogen, and oxygen. Thus, a preferred encapsulating material can be, for example, polyethylene. Gelatin is a suitable encapsulating material but it is not preferred, since the combustion products of the nitrogen component therein may cause some quenching.

A preferred embodiment of combustion furnace 12 is depicted in FIGS. 2 and 3. FIGS. 2 and 3 depict a simplified representation of a combustion furnace developed by the National Institutes of Health. That combustion furnace comprises a vertically disposed tube 172 which acts as the combustion chamber. It is packed with catalyst 174 which is retained on a perforated plate 175 which is attached to the sidewalls of tube 172. A preferred catalyst is a mixture of copper oxide and hopcalite. Surrounding tube 172 is a heating element 176. Tube 172 has an insulated conical section in its bottom portion. It contains an oxygen inlet 178 in the top portion of its sidewall, a combustion product outlet 180 at the apex of its conical section, and a sample inlet 182 in its top surface. Outlet 180 contains a valve 181 corresponding to valve 24 in FIG. 1. Communication with said sample inlet 182 is a sample feed tube 184. Tube 184 is sized so as to admit a radioactive sample. Tube 184 contains a stopcock 186 having a bore 188 passing radially therethrough which is coextensive with a portion of tube 184. Bore 188 is cylindrical and has one of its end faces plugged. Bore 188 is sized so as to be able to contain a single radioactive sample.

In the operation of combustion chamber 12 as depicted in FIGS. 2 and 3 an elevated temperature sufficient to sufficiently combust the samples is maintained in disposed tube 172 by heating element 176. Oxygen is fed through the oxygen inlet 178. Samples are sequentially fed by sample transport mechanism 10 via the feed chute 173 into sample feed tube 184, with stopcock 186 being positioned so that bore 188 is coextensive with feed tube 184 with the plugged portion of bore 188 positioned at the bottom end of bore 188. Valve 181 is open from $a$ in the direction of $c$. A radioactive sample having been fed by transport mechanism 10 goes through feed tube 184 into the bore 188 of stopcock 186 and is retained by the plug in bore 188. Stopcock 186 is then rotated 180 degrees by means of a rotary solenoid (not shown) in response to a signal provided by the program sequence control unit. Thus the sample in bore 188 is delivered into tube 172 and tube 172 is sealed to the external environment. When the sample is fed valve 181 opens from $a$ in the direction of $b$. The sample which is fed falls on top of catalyst bed 174 and is combusted. Combustion is completed in, for example, slightly under 2 minutes. The oxygen feed sweeps the combustion product through outlet 180 to the HTO absorber 26 or directly into the $CO_2$ absorber 52 depending upon the position of the valve 25. The operating oxygen flow rate is suitably one liter per minute.

A preferred embodiment of HTO absorber 26 is depicted in FIG. 4. The absorber comprises a conical portion 190 which surrounds and is parallel to a funnel 191 to define a channel 192. The funnel 191 receives the combustion products from the furnace 12 after they pass through the valves 24 and 25 and delivers them to the bottom of the channel 192. Channel 192 communicates with a scintillator inlet line 28 in its top portion and with a mixing coil 196 in its bottom portion. Coil 196 is surrounded by a cooling chamber 198 which has insulated walls 200. Cooling chamber 198 is provided with inlet line 201 and outlet line 202 so that cooling medium can be circulated through chamber 198. Coil 196 communicates in its lower portion with test sample supply line 30. Scintillator is fed through inlet line 28 at the same time that combustion product is received in funnel 191. At the outlet of the funnel 191 combustion product contacts the scintillator whereby intimate mixing occurs whereupon the combination flows down through coil 196. Cooling medium passes through cooling chamber 198 in a direction countercurrent to said combustion product-scintillator flow. The coil 196 provides residence time and results in mixing whereby HTO is trapped in said scintillator. The cooling provided by the passage of cooling medium through chamber 198 facilitates the trapping and absorption of HTO in the scintillator. Scintillators which trap and favor the counting of HTO but pass $CO_2$ which are known in the art are suitable for use herein. A suitable scintillator comprises dioxane, naphthalene, PPO, and PPOP. Scintillator flow rate into inlet line 28 can be, for example, 10 cc. per minute with addition of scintillator occurring over a two minute period.

A preferred embodiment of $^{14}CO_2$ absorber 52 is depicted in vertical cross-section in FIG. 5. The absorber comprises a vertically oriented tube 203 which contains a flat metal sheet 204 which is mechanically linked to a motor 206. The tube 203 with its flat sheet 204 and motor 206 is known in the art as a spinning band column. Tube 203 contains in its top portion a gas tight rotary seal, an inlet line 50 for gases including remaining combustion product, and also a scintillator inlet line 54. Tube 203 has at its bottom an outlet line 56. Tube 203 is contained within a cooling chamber 208. Chamber 208 is provided with an inlet line 210 and an outlet line 212 for the circulation of cooling medium. Chamber 208 has insulated walls 214.

Scintillator is fed through inlet line 54 at the same time that $^{14}CO_2$-containing gas is fed through line 50 whereby contact occurs between these materials. The combination passes down through tube 203 and intimate mixing is caused to occur by the rotation, that is by the spinning of the member 204. As a result $^{14}CO_2$ is trapped within and absorbed into the scintillator whereby a test sample is provided. The circulation of cooling medium via inlet 210 and outlet 212 through chamber 208 facilitates the trapping. The resulting test sample passes out of the absorber at 56. Scintillators which trap $CO_2$ and favor the counting of $^{14}CO_2$ are suitable for use herein. These are known in the art. A suitable scintillator comprises toluene, phenylethylamine, methanol, PPO and PPOP. A suitable scintillator feed rate is 10 cc. per minute for 2 minutes.

A preferred detector 116 or 126 is depicted in FIG. 6. This detector mechanism comprises a horizontally oriented cylindrical body portion 216 having contained in its end openings O-rings 218 which hold in place photomultiplier tubes 220 having counting windows 222. The O-rings provide liquid tightness. Body portion 216 communicates with a filling tube 225. Body portion 216 also communicates with an exhaust port 224. The exhaust port communicates via piping with a source of vacuum shown as 127 in FIG. 1. Filling tube 225 and body portion 216 are preferably constructed of Teflon. O-rings 218 are preferably constructed of Viton A. Said detector is surrounded by 2-inch lead shielding (not shown). A test sample is sucked into a chamber 226 defined by the end faces, that is the counting windows 222, of photomultiplier tubes 220, and body portion 216 by action initiated by the vacuum source acting through exhaust tube 224. When the detector contains the test sample, counting is carried out. Once the counting is completed, vacuum is applied to the waste receptacle, valve 137 is automatically opened, whereby the test sample is drawn from chamber 226 through line 136 to waste. Valve 137 is then closed and the vacuum is operated through port 224 to initiate action whereby washing solution is drawn from a communicating intermediate chamber through filling tube 225 into chamber 226 whereby residual radioactivity is washed from the surfaces of chamber 226 so that future counts are very accurate. The wash solution is then exhausted from chamber 226 as a result of the same process described above for removal of test solution to waste. At this point valve 137 again closes and chamber 226 is ready for a new test sample, and the process is reinitiated.

Upon initiation of counting the test sample or samples obtained from combusting a sample, the sample transport advances to deliver a new sample to combustion furnace 12. Combustion furnace 12 at this point has already been exhausted. Dual pumps 94 and 95 and valves 109, 111, 115, and 117 again operate to supply scintillator to absorbers 26 and 52 and to supply washing agent to previously utilized intermediate storage chambers. The vacuum source in combination with the valving and piping associated with said detectors operates in response to the finishing of a count to empty test samples from detectors and thereafter to draw in washing agent and thereafter to draw in new test samples.

Preferred electronics 148 or 152 are depicted in FIG. 7. As shown in this figure, the two multiplier tubes 220 are energized by a source of high voltage 250. In response to scintillations in the test sample contained in chamber 226, the photo-multiplier tubes 220 produce pulses which are added together by a summing circuit 252 to produce a single pulse for each scintillation generated in the test sample and detected by the photo-multiplier tubes. The output pulses of the summing circuit 252 are amplified by a logarithmic amplifier 254 and applied to a linear gate 256. When enabled, the linear gate 256 will pass the applied pulses without changing the relationships of their amplitudes to a single channel analyzer 258. The pulses produced by the photomultiplier tubes 220 are applied severally to a coincidence trigger circuit 260, which in response to receiving pulses simultaneously from both photo-multiplier tubes will enable the linear gate 256. Thus, the linear gate will be enabled and pass the applied pulses from the logarithmic amplifier 254 only if both photo-multiplier tubes 220 produce an output pulse. In this manner the linear gate 256 and the coincidence gate 260 function to prevent spurious or noise pulses from being passed to the single channel analyzer 258. The single channel analyzer 258 responds to the amplitude of the applied pulses and only passes pulses which are in a predetermined amplitude range selected in accordance with the radioactive material causing the scintillations in the test sample. The pulses passing through the analyzer 258 are counted by a scaler 262 over a selected interval of time to provide an indication of the pulse rate in the amplitude range defined by the single channel analyzer 258. The count determined in this manner by the scaler 262 is displayed by a visual display 264 and printed out by a printer 266.

As shown in FIG. 8, which schematically illustrates the photocell detecting system for detecting the approach and type of samples of the combustion furnace, a light source 302 shines at a beam on to each compartment of the link chain 160 just before the compartment reaches the aperture 170. Light is reflected from any sample contained in the compartment to a photocell detector 304. The photocell detector contains three photocells each located behind a filter selected to transmit light of a different color such as red, green and blue. If the sample is red, the photocell behind the red filter will receive the most reflected light from the sample; if the sample is blue, the photocell behind the blue filter will receive the most reflected light from the sample; and if the sample is green, the photocell behind the green filter will receive the most reflected light. The photocell detector produces an output signal in response to the reflected light and indicating which of the photocells receives the most reflected light. The samples are color coded so that all samples of the same type are the same one of the three colors red, green, or blue. For example, samples containing both $^{14}C$ and $^3H$ could be red, samples containing only $^{14}C$ could be blue, and samples containing only $^3H$ could be green. Thus the output of the photocell detector 304 will indicate which kind of sample is approaching each time a new sample approaches the aperture 170 to be delivered to the combustion furnace.

FIG. 9 is a block diagram schematically showing the electronics for automatically controlling the system of FIG. 1. As shown in FIG. 9, the program sequence control unit is designated by the reference number 306. In response to receiving a signal from a start control 308, the program sequence control unit 306 will energize the sample transport 10 to start delivering a sample to the combustion furnace through the aperture 170. When the first sample reaches the photocell detector 304 as it approaches the aperture 170, the photocell detector 304 will apply a signal to the program sequence control unit 306 indicating that a sample is approaching and also indicating which type of sample is approaching, that is whether the sample contains both $^3H$ and $^{14}C$, only $^{14}C$, or only $^3H$. The sample transport 10 coacts with a limit switch to provide a signal each time a new compartment comes into position over the aperture 170. In response to receiving a signal from the photocell detector 304, the program sequence control unit 306 will stop the sample transport upon receiving the next signal provided by the limitswitch indicating that the compartment has arrived over the aperture 170. Immediately thereafter the program sequence control unit 306 will actuate the stop cock 186 to deliver the sample to the combustion furnace. At the same time the program sequence control unit 306 will begin operation of the pumps 94 and 95 and will then actuate the solenoid operated valves and the counting electronics of the system of FIG. 1 in the proper sequence, which sequence will vary depending upon the type of sample indicated by the signal produced by the photocell detector 304. The program sequence control unit 306 in actuating the solenoid operated valves and the counting electronics at the proper times responds to signals applied thereto from the pumps 94 and 95 indicating when the pumps have completed their stroke and thus have filled the storage chambers 36, 40, 62 and 66. The program sequence control unit 306 also receives signals from the valves 32 and 58 indicating the position of the valves 32 and 58 so as to actuate the correct ones of the valves 113 and 114 and the correct one of the valves 123 and 124 at the proper times depending upon the condition of the valves 32 and 58. The program sequence control unit 306 also receives and responds to signals from the counting electronics 148 and 152 indicating when the counting operations on the test samples have been completed to control the system of FIG. 1 to operate in the proper sequence as is explained in more detail below. In the block diagram of FIG. 9, the solenoid operated valves 20, 24, 25, 48, 78, 80, 109, 111, 113, 114, 115, 117, 123, 124, 133, 134, 137, 139, 144, 407 and 408 all are represented schematically by the block 310.

Figure 10A:
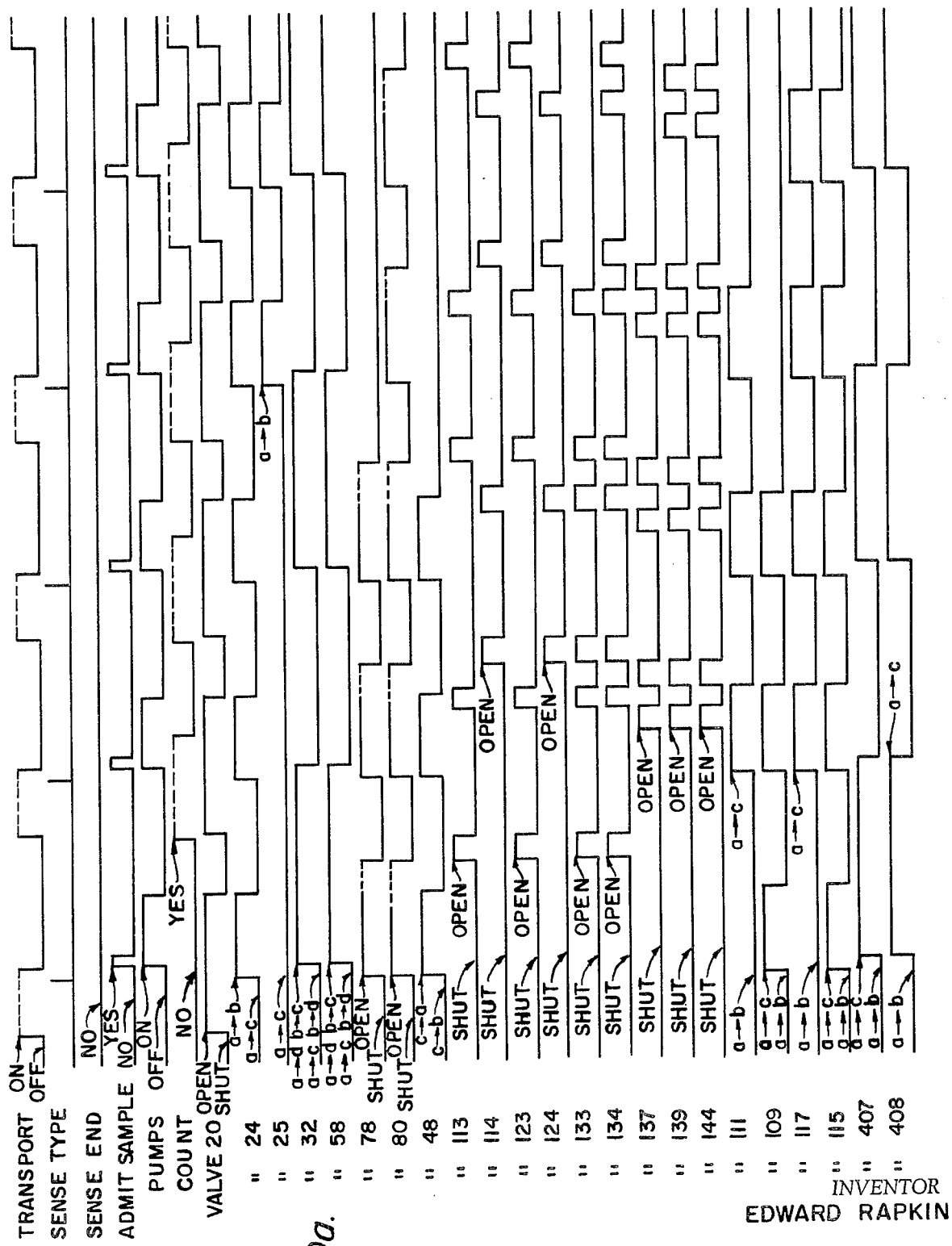
FIGS. 10A and 10B show a timing diagram illustrating an example of the operation of the system of FIG. 1.
Figure 10B:
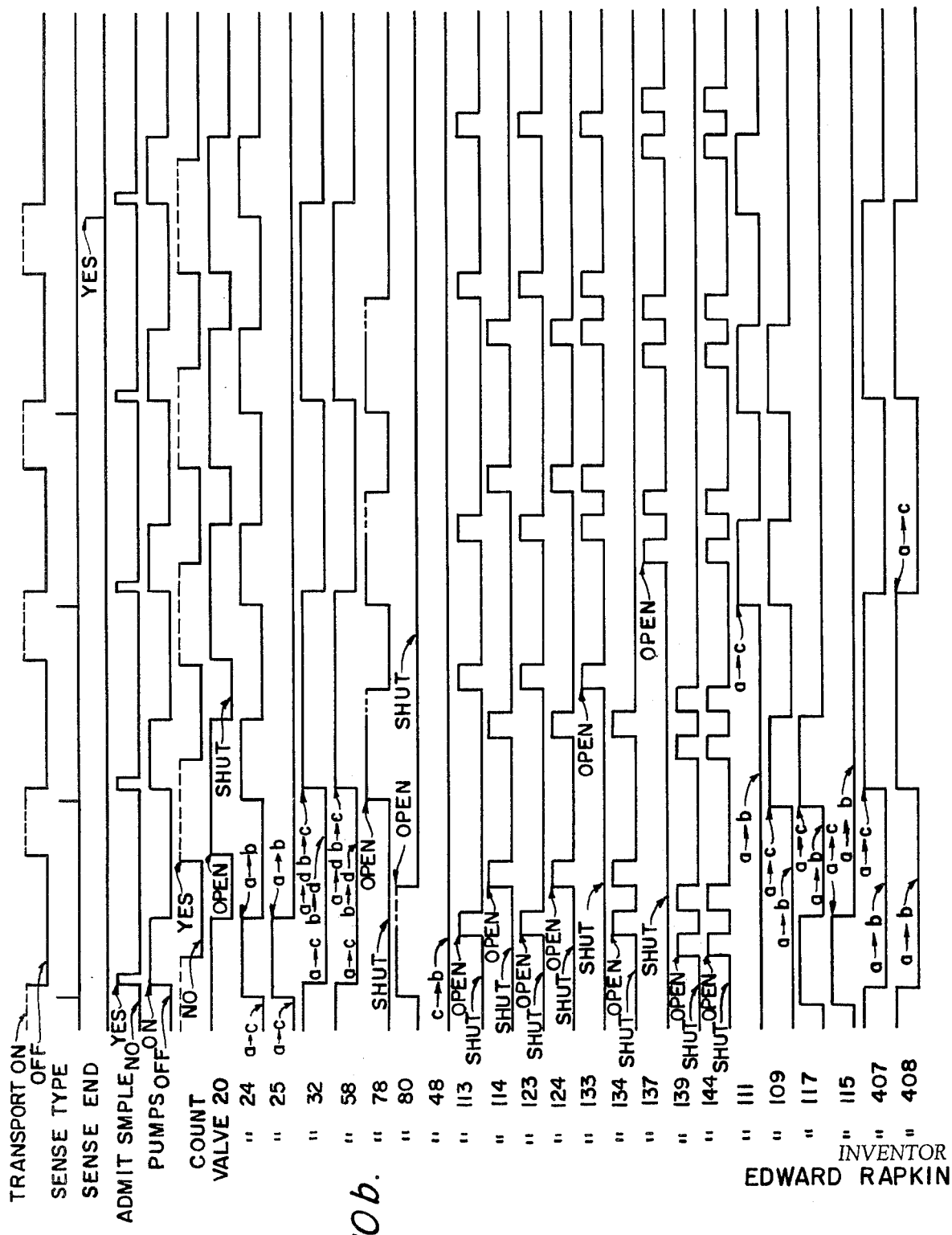

The exact sequence of the operation of the system illustrated in FIG. 1 will be better understood from the timing diagram illustrated in FIGS. 10A and 10B. This timing diagram illustrates the sequence of operation of each of the solenoid operated valves, the pumps, the counting electronics, the stop cock, and the sample transport for different types of samples delivered to the combustion furnace. In the example given the first three samples contain both $^3H$ and $^{14}C$, the next three samples contain only $^{14}C$, and the last three samples contain only $^3H$.

In the diagram the condition of each valve and other pieces of equipment is represented graphically by a line shown at two levels. For valves which just open and close, the graphical representation in its upper level means the valve is open and in its lower level means the valve is closed. For valves which direct a stream in either of two output lines, the specific meaning of the two levels of the graphical representation is indicated on the left side of FIG. 10A. Thus, the valves 32 and 58 are indicated as opening from $a$ to $d$ and $b$ to $c$ when the representation is at its upper level and are indicated as opening from $a$ to $c$ and $b$ to $d$ when the representation is at its lower level. The pumps are represented as operating when the graphical representation is at its upper level and as inactive when the representation is at its lower level. Similarly, the representation of the condition of the counting electronics is at the upper level when the counting electronics are counting test samples and is at the lower level when the counting electronics are inactive. The graphical representation of the condition of transport 10 is at the upper one of its two levels to indicate when the transport is operating and is at the lower one of its two levels when the transport is inactive.

As shown in FIGS. 10A and 10B in response to a signal applied to the program sequence control unit 306 from the start control 308, the program sequence control unit 306 first actuates the transport 10 to begin delivering a sample to the combustion furnace. The control unit 306 opens valve 20 whenever it energizes the transport 10 so at this time the control unit 306 will open valve 20 to allow the oxygen to flow into the combustion furnace 12 at the operating rate. The photocell detector 304 then detects that the first sample is approaching the aperture 170 and indicates to the control unit 306 that the sample approaching is of the type containing both $^3H$ and $^{14}C$. Each time the control unit 306 receives a signal indicating that the type of sample contains both radioactive isotopes, the control unit 306 immediately opens valves 78 and 80 and moves valves 48, 109, and 115 to the position in which they each open from a to c. Accordingly, at this time nitrogen from source 74 will begin to flow into the storage chambers 36 or 40 and 62 or 66, and the resulting exiting stream in line 46 from storage chambers 36 or 40 will be directed into the $CO_2$ absorber 52 by the valve 48.

If the photocell detector signal indicated that the approaching sample contained only $^{14}C$, the control unit 306 would open only valve 80 and would maintain valve 78 closed and only valve 115 would open from $a$ to $c$ with valve 109 remaining open from $a$ to $b$. If the photocell detector signal indicated that the approaching sample contained only $^3H$, the control unit 306 would open only valve 78 and would maintain valve 80 closed. Valve 109 would open from $a$ to $c$ whereas valve 115 would remain at its rest position, being open from $a$ to $b$. In both of the above two cases the control unit would maintain the valve 48 in a condition to open from $c$ to $b$.

In response to the photocell detector signal, the control unit 306 will in addition at this time also actuate the valve 24 to open from a direction a to b. The control unit 306 will always actuate the valve 24 in this manner at the time the photocell detector 304 detects an approaching sample regardless of the type of sample which is approaching. Each time the limit switch of the sample transport is actuated following a signal by the photocell detector 304, indicating that a sample has been delivered to aperture 170, the control unit 306 actuates the stop cock 186 to admit the sample to the combustion furnace. The control unit 306 also at this time energizes the pumps 94 and 95 to begin their strokes. In addition, at this time the valves 32, 58, 407, and 408 are actuated to reverse their positions.

In response to receiving the limit switch signal following the photocell detector signal and the signal from the start control, indicating that the sample delivered is the first sample, the control unit 306, as previously noted, switches only the valves 107 and 115 to open from $a$ to $c$ whereas valves 111 and 117 remain open from a to b so that the washing agent returns to its reservoir the first time the pumps are operated. The washing agent is bypassed at this time because the sample received is the first sample and there is no need to wash any of the storage chambers or either of the detectors. As the pumps operate, the storage chambers 36 or 40 and 62 or 66 are filled with test samples obtained from the absorbers 26 and 52 whereas the other storage chambers are left empty.

At the completion of the pump stroke, the pumps 94 and 95 apply a signal to the control unit 306 indicating that the pump stroke has been completed and in response to this signal the control unit 306 closes the valve 20 and switches the valve 24 to open from $a$ to $c$. In addition, if the valve 48 opens from $c$ to $a$ during the pump stroke, at the completion of the pump stroke valve 48 is switched to open from $c$ to $b$ so that the gases purged from the storage chamber 40 will then enter the scrubber 88. Also, at this time if any of the valves 109, 111, 115, or 117 are open from $a$ to $c$, they are switched back to open from $a$ to $b$. Thus when the storage chambers 36 or 40 and 62 or 66 have been filled with the test samples, valve 20 closes, valve 24 switches to open from a to c, valve 48 switches to open from $c$ to $b$, and valves 111 and 117 switch to open from $a$ to $b$.

The control unit 306 will close valves 78 and 80 a fixed time interval after they are opened. This time interval is selected to be sufficient to purge the test samples in the storage chambers and is sufficiently long to end after the pumps 78 and 80 have completed their stroke. At the time when either or both of valves 78 and 80 close, the control unit 306 opens one of the valves 113 or 114 and one of the valves 123 or 124. The control unit 306 responds to the signals indicating the condition of the valves 32 and 58 to select which valves to open. In response to the valves 32 and 58 being in the condition of opening from $a$ to $d$ and from $b$ to $c$, the control unit 306 opens valves 113 and 124. In response to having last received a signal from the photocell detector 304 indicating that the delivered sample contained both isotopes $^3H$ and $^{14}C$, the control unit 306 at this time also opens valves 133 and 134 to deliver the test samples in the storage chambers 36 and 66 to the detectors 116 and 126 respectively. If the last received photocell detector signal indicated the sample contained only $^{14}C$, the control unit would only open valve 134 at this time. If the last received photocell detector signal indicated that the sample contained only $^3H$, the control unit would open only valve 133 at this time.

After fixed times sufficient for the test samples to be delivered to the detectors 116 and 126, whichever ones of the valves 113, 114, 123, 124, 133 and 134 are open, are closed. At this time the control unit 306 energizes the sample transport 10 to begin delivering the next sample to the combustion chamber. Also at this time the control unit 306 actuates the counting electronics 148 and 152 to start the counting of the test samples in the detectors 116 and 126. In addition the valve 20 is again opened, since it is opened each time the sample transport is energized to deliver a new sample.

When the compartment containing the second sample nears the aperture 170, the photocell detector 304 will again apply a signal to the control unit 306 indicating that a sample is approaching and also that the sample is of a type containing both isotopes. Meanwhile, the counting electronics 148 and 152 will be counting the test samples in the detectors 116 and 126. In response to the photocell detector signal and the limit switch signal indicating that the compartment has come into position over the aperture 170, the control unit 306 will again actuate the stop cock 186, the pumps 94 and 95, and the valves 24, 78, 80, 109, 115 and 48 in exactly the same manner as described with respect to the first sample. In addition, as hereinafter described, in view of the fact that valves 109 and 115 were actuated for the previous sample, both valves 111 and 117 open from a to c so as to permit delivery of wash solution to the intermediate storage chamber last used to collect test solution. The valves 32, 58, 407 and 408 will reverse position at the time the sample is delivered through the aperture 170.

In the example illustrated in FIGS. 10A and 10B, the second sample is delivered before the count is completed by the counting electronics as would generally be the case if the second sample is contained in a compartment in the sample transport not too far removed from the site of sample introduction. However, if there were some vacant compartments, the next sample may not be delivered until after the completion of the count. In any case, system logic is such as to accommodate either condition. In the example illustrated, the pumps begin to operate delivering scintillators and washing agent while the previous test sample is still being counted.

At the completion of each counting operation the counting electronics applies a signal to the control unit 306, in response to which the control unit immediately opens valve 144 and one or both of valves 137 and 139 depending upon the nature of the sample. If the control unit 306 has previously received a signal from the detector 304 indicating that the sample being counted contains only $^3H$, then at the completion of the counting operation the control unit 306 will open valve 137 to empty detector 116. If the control unit 306 has previously received a signal from the detector 304 indicating that the sample being counted contains $^{14}C$, then at the completion of the counting operation the control unit 306 will open valve 139. Thus when the test samples obtained from the first sample combusted have been counted, valves 137 and 139 will both open along with valve 149 to empty the detectors 116 and 126. These valves are opened for a fixed time selected to be sufficient to completely empty the detectors 116 and 126.

During the pump stroke occurring during combustion of the second sample, the valves 111 and 117 open from a to c so that washing agent is delivered to the appropriate storage chambers. At the time the second sample is delivered to the combustion chamber, the control unit 306 switches the valves 32 and 58 so that the pumps deliver the washing agent to the first of storage chambers 36 or 40 and 62 or 66 and the test samples obtained from the combustion of the second sample are thereby delivered to the said second storage chambers of 32 or 40 and 62 or 66.

Each time the control unit 306 receives a signal indicating that a count has been completed, the control unit 306 will open valve 144 and one or both of the valves 137 and 139 thereby emptying one or both detectors, depending upon the nature of the previous test sample. Once the detectors have been drained, valves 144 and 137 and/or 139 close. The detector is washed by means of the washing solution contained in storage chambers 36 or 40 and/or 62 or 66. The valve 113 or 114 selected and the valve 123 or 124 selected will be determined by the signal received by the control unit 306 from the valves 32 and 58 indicating their condition. The signal from the valves 32 and 58 indicates which storage chambers were connected by the valves 32 and 58 to receive washing agent. If the storage chambers 36 and 66 were connected by the valves 32 and 58 to receive washing agent, then upon closure of valves 144 and 137 and/or 139 the valves 113 and 124 will be opened. If the storage chambers 40 and 62 were connected to receive the washing agent, then valves 114 and 123 are opened upon closure of valves 144 and 137 and/or 139. The valves 133 and/or 134 are opened at this time in response to the original signal from the detector 304 which has sensed the nature of the sample previously counted. If the storage chamber 36 or 40 which is selected by the valve 32 to receive washing agent during the pump stroke contains liquid at the end of the pump stroke, then the valve 133 will be opened at the end of the pump stroke. Similarly, if the storage chamber 62 or 66 which is selected by the valve 58 to receive washing agent during the pump stroke contains liquid at the end of the pump stroke, the valve 134 will be opened at the end of the pump stroke. The selected valves are opened for a fixed period sufficient to empty the storage chambers and fill the detectors. When the selected valves close again, the control unit 306 will open the valve 144 and one or both of the valves 137 and 139, depending on whether the logic of control 306 indicates that the detectors 116 and/or 126 contain liquid. These valves will then be closed again after a fixed time interval selected to be sufficient to empty the detectors 116 and 126. In this manner at the end of each sample count one or both of the detectors 116 and 126 is filled with washing agent and then emptied. This operation may end either prior to or after the closing of one or both of the valves 78 and 80. The next test sample or samples is (are) transferred from the storage chambers to the detectors as a result of a logic condition in control 306 established by the closure of valves 78 and/or 80 and the completion of every second operation of valve 144. In the example cited, since the second test substance contains both $^3H$ and $^{14}C$, both detectors are filled by opening the appropriate valves of 113 or 114 and 123 or 124 together with 133 and 134. Valves are kept open for a fixed period sufficient to allow for essentially complete fluid transfer and then they are closed. The system is now ready to receive the third sample in the combustion chamber. Accordingly, when counting of the second sample is initiated as a result of each second closure of valves 133 or 134 after the first such closure, a signal is applied to the transport 10 to begin delivery of the next sample. Since the third sample contains both radioactive isotopes, the system operates exactly in the same manner as described with respect to the second sample except that the valves 32, 58, 407 and 408 are switched and the valves 113, 114, 123 and 124 are operated accordingly.

When the fourth sample is detected by the photocell detector 304, the detector 304 will indicate to the control unit 306 that this sample contains $^{14}C$ only. In response to this signal the control unit 306 switches the valve 25 to open from a to b to direct the combustion products directly to the $CO_2$ absorber 52 and switches the valve 115 but not 109 to open from a to c during the next pump stroke so as to bypass Scintillator A back to its storage reservoir. At the end of the pump stroke the valve 25 switches back to open from $a$ to $c$ and valve 115 reverts to being open from $a$ to $b$. During the said fourth pump stroke valves 111 and 117 are open from $a$ to $c$ so as to deliver washing agent to the storage chambers 36 or 42 and 62 or 66 last containing a sample since at this point of the cycle it must be remembered that the storage chamber 36 or 42 will have been emptied of the previous test sample and will not have been washed by any washing agent. In every case such operation of valve 111, as well as valve 117, is established by virtue of valves 109 and/or 115 having been open from $a$ to $c$ for the previous sample. In addition, during combustion of the fourth sample as well as the fifth and sixth samples, the valve 48 remains in the condition opening from $c$ to $b$ and the valve 78 remains closed with valve 80 being opened in response to the signal from the photocell detector.

When the fifth sample is received and is being combusted, the pumps 94 and 95 are again operated as before but this time both valves 109 and 111 are open from $a$ to $b$ to bypass the scintillator and the washing agent back to their respective reservoirs, there being no operation of valve 111 because valve 109 has not operated for the previous pump stroke.

The solenoid operated valves 113, 114 and 32 are operated in the same manner for the fourth, fifth and sixth samples as for the preceding samples even though the storage chambers 36 and 40 are empty, thereby resulting in simplified control logic. The valve 133 opens with the valve 113 at the end of the pump stroke occurring during combustion of the fourth sample to fill the detector 116 with the washing agent which is stored in the storage chamber 36 or 40 depending upon the initial condition of the system at the time of combustion of the first sample. The valve 133 opens at the end of this pump stroke because the storage chamber which is selected by the valve 32 to receive washing agent during this fourth pump stroke contains liquid. Logic for operation of valves 137 and 139, as incorporated in control 306, is such that each of said valves goes through two full operations, one for admission of sample and one for admission of wash, for each sample for which they are qualified to operate. Each pair of operations may therefore be considered a complete cycle. Under these conditions as explained above, the valve 133 will open after the completion of a count and the emptying of the counting solution from detector 116.

While the storage chamber 36 or 40 is filled with washing agent during the fourth pump stroke, the storage chamber 62 or 66 will be filled with a test sample from the $CO_2$ absorber 52 and the other of the storage chambers 62 or 66 will be filled with washing agent. At the end of the fourth pump stroke, the detector 126 will be filled with washing agent from storage chamber 62 or 66 and then emptied in the same manner as described at the end of previous pump strokes. When the washing agent is emptied from the detector 126 after the fourth pump stroke, it will also be emptied from the detector 116 in the same manner as described above following previous pump strokes.

At the end of the purging operation following the fourth pump stroke when valve 80 closes and the aforedescribed second operation of valve 144 is completed, the test sample in storage chamber 62 is transferred to the detector 126, then counted, and then emptied from the detector 126 in the same manner as described above with respect to previous test samples. The system in combusting and counting the fifth and sixth samples operates in the same manner as during the fourth sample except that during the fifth and sixth pump strokes, the valve 111 will open from a to b as pointed out above and the valves 133 and 137 remain closed.

When the seventh sample containing only the radioactive isotope $^3H$ is received in the combustion chamber, the valve 25 remains in a condition opening from $a$ to $c$ so that the combustion products of the furnace 12 will go into the absorber 26 and the valve 48 remains in a position opening from c to b so that the vent gases in line 46 go to the scrubber 88. During the seventh pump stroke the control unit 306, in response to the signal received from the photocell detector just prior to this pump stroke indicating that the sample contains only $^3H$, switches the valve 115 to open from a to b to bypass the scintillator back to reservoir 100. The valve 117 opens from a to c to deliver the washing agent to the appropriate storage chamber which in this case will be storage chamber 62 or 66 whichever has just been emptied of a test sample and has not yet been washed.

The control unit 306 controls the valve 117, similar to the control of the valve 111, in response to the photocell detector signal received prior to the previous pump stroke. If the photocell detector signal received prior to the previous pump stroke indicates that the then approaching sample contains only $^3H$, it will allow, by virtue of the lack of operation of valve 115, valve 117 to remain open from $a$ to $b$ causing the pump stroke to bypass the washing agent. Otherwise, if valve 115 has operated for the previous sample, the control unit will maintain the valve 117 to open from $a$ to $c$ during the pump stroke. Thus, the valve 117 will be opened from $a$ to $c$ during the seventh pump stroke but will rest open from $a$ to $b$ during the eighth, ninth, and tenth pump strokes since the seventh, eighth and ninth samples contain only $^3H$.

During the eighth and ninth pump strokes, the valve 115 will bypass the scintillator back to reservoir 100 as it does during the seventh pump stroke. The valve 109 will open from a to c during the seventh pump stroke to deliver the scintillator to the HTO absorber 26. Valve 111 will open from a to b to bypass the washing agent back to reservoir 104 during the seventh pump stroke since valve 109 has not operated during the sixth pump stroke inasmuch as the test substance combusted contained only $^{14}C$. The valve 78, which was maintained closed during the combustion of the second three samples, is opened in response to the photocell detector signals caused by the last three samples at the time these signals are generated just as in the case of the first three samples, whereas the valve 80 remains closed for the last three samples. The valves 123, 124, and 58 are operated as in the preceding cycles although these valves are not actually used except to deliver the washing agent to the storage chamber 66 during the seventh pump stroke and to the detector 126. After the washing agent has been emptied from the detector 126, the valves 139 and 134 remain closed following the combustion of the last three samples as these samples have no $^{14}C$ content.

When the last sample has been combusted and counting of this sample begins, the transport will again be actuated to move the next compartment to the aperture 170; however, this compartment will contain a marker which actuates a limit switch positioned to sense such a marker and indicating the end of the sequence. In response to this signal the system will operate to complete the cycle to wash out the proper storage chambers and detectors and then stop operations as shown in FIG. 10B. The valves 109 and 115 remain open from a to b to bypass the scintillators back to reservoirs 96 and 100 respectively. In addition, valve 117 also remains open from a to b to bypass the washing agent back to reservoir 104 since valve 115 has not operated during the preceding pump stroke. Only the valve 111 is opened from a to c to deliver washing agent to the storage chamber 36 or 40. Upon completion of the count in progress detector 116 is emptied of its sample by the operation of the proper valves. Detector 116 is washed in normal fashion by the contents of storage chamber 36 or 40. At this point the control unit 306 stops the operation of the system in response to having received the signal indicating the end of the sequence.

Many modifications are possible in the aforedescribed system and method without departing from the scope of the invention. For example, purging can be carried out with gases other than nitrogen, e.g., with argon or other inert gases or, somewhat less effectively but with greater economy, with dry air. Moreover, acceptable counting accuracy but with reduced counting efficiency is achieved even if the purging steps are eliminated completely. Purging is preferred to achieve the most accurate results. Moreover, acceptable counting accuracy can be achieved even if the washing steps are eliminated through washing as described is preferred for the most accurate results.

The system of FIG. 1 can be utilized to count other isotopes which form volatile oxides by utilizing appropriate scintillator and trapping agents.

If a system within the scope of the invention is only to be used for single isotope counting, only one dual pump is required. Moreover, a single absorber, only two intermediate storage chambers, a single detector, and only half the electronics will suffice.

For counting two isotopes in a sample without separate absorption steps, the system of FIG. 1 can be modified as shown in FIG. 11. The equipment, piping and valving in FIG. 11 has the same function as equipment, piping and valving having the same reference numerals in FIG. 1 except that the absorber collects and traps both HTO and also $^{14}CO_2$ and the detector counts HTO and $^{14}CO_2$. The scintillator utilized is one that favors the absorption and counting of both HTO and $^{14}CO_2$; it can be Scintillator B described hereinbefore.

Electronics 230 are particularly depicted in FIG. 12. As shown in this figure, the electronics 230 are the same as that shown in FIG. 7 except that the output of the linear gate is applied to two single channel analyzers 280 and 282. One of the two analyzers 280 and 282 is set to pass pulses in an amplitude range which would be produced by scintillations caused by HTO (together with low energy $^{14}C$ events) and the second analyzer is set to pass pulses in an amplitude range caused by scintillations produced by $^{14}CO_2$. Well established mathematical procedures are available to permit estimation of the quantity of $^{14}C$ "cross contribution" in the $^3H$ counting channel. The output of the analyzers 280 and 282 are applied to scalers 284 and 286 which count the output pulses over a time interval and thus provide an indication of the pulse rate and the amplitude ranges defined by the analyzers 280 and 282. The counts determined by the scalers 284 and 286 are displayed by a visual display 288 and are printed out by a printer 290. This system can also be used to count a single isotope by utilizing different channel settings which may be more suitable when there is no "cross contribution". It is to be noted that the system of FIG. 11 is readily convertible into the system of FIG. 1 by the changing of the electronics and by adding equipment, piping, valving and electronics.

Two-isotope counting can be also carried out within the scope of the present invention utilizing a three-syringe pump, a single absorber, two intermediate storage chambers, a single detector, and only half the electronics depicted in FIG. 1, by the use of two scintillators. In this case two radioactive samples are prepared, each containing the same substance. During the first combustion tritium is collected and later counted. During combustion of the second radioactive sample, $^{14}CO_2$ is collected and later counted. The trapping agent is changed between collections. When each isotope is counted, the amplitude range or the counting window and the detecting chamber are automatically adjusted by presently well established procedures.

In another variation, a dual isotope sample can be combusted and products collected as shown in FIG. 1. Combustion products can then be counted sequentially in a single detector rather than in two. In this case also, counting windows have to be changed automatically back and forth between each count.

The system and method of the present invention have the advantage of increased process efficiency, since the conventional sample handling step prior to combustion has been eliminated and since the sample handling step after absorption and prior to detection has been eliminated. Moreover, the system and method of the present invention allow the elimination of the use of the counting vial, thereby reducing costs and eliminating problems of non-reproducible counting and background emanating from vial to vial variation. By virtue of elimination of the counting vial, sample counting efficiency is also enhanced due to the elimination of light absorption in the wall of said counting vial. Further enhancement of counting efficiency derives from the ability to contain any given volume of scintillator solution within a chamber whose shape is more suited to the shape of the light sensitive faces of the photomultipliers than is the shape of the conventional counting vial. Light collection and hence counting efficiency is even further improved by bringing the photomultiplier faces appreciably closer together than would be possible with the same solution volume contained in the usual vertical standing cylindrical counting vial.

What is claimed is:

1. A liquid scintillation counting system comprising (a) a combustion chamber for combusting radioactive samples; (b) conveying means for retaining a multiplicity of said radioactive samples in storage and for conveying said radioactive samples from said storage into said combustion chamber in sequence so that each sample enters said chamber when said chamber is ready for a new sample; (c) means for collecting from said combustion chamber combustion product resulting from the combustion of each sample and retaining said product in a liquid scintillator to provide at least one test sample corresponding to each radioactive sample combusted; and (d) a detecting means communicating with said collecting means, receiving and counting said test samples, said conveying means comprising a horizontally oriented link chain positioned directly above a horizontally oriented flat plate containing a single aperature, said link chain defining a series of compartments, each compartment being open at the top and bottom and being sized to hold a sample.

2. A liquid scintillation counting system as recited in claim 1 further comprising means to detect the approach of each sample in said compartments to said aperture.

3. A liquid scintillation counting system comprising (a) a combustion chamber for combusting radioactive samples; (b) conveying means for retaining a multiplicity of said radioactive samples in storage and for conveying said radioactive samples from said storage into said combustion chamber in sequence so that each sample enters said chamber when said chamber is ready for a new sample; (c) means for collecting from said combustion chamber combustion product resulting from the combustion of each sample and retaining said product in a liquid scintillator to provide at least one test sample corresponding to each radioactive sample combusted; and (d) a detecting means communicating with said collecting means, receiving and counting said test samples, said collecting means comprising an absorber and at least one storage chamber interposed between an absorber and detecting means (d).

4. A liquid scintillation counting system as recited in claim 3 wherein two storage chambers in parallel are interposed between said absorber and said detecting means.

5. A liquid scintillation counting system as recited in claim 4 wherein said storage chambers communicate with said absorber by piping containing a valve operating to fill each of said storage chambers with a test sample alternatively with the combustion of each sample.

6. A liquid scintillation counting system comprising (a) a combustion chamber for combusting radioactive samples; (b) conveying means for retaining a multiplicity of said radioactive samples in storage and for conveying said radioactive samples from said storage into said combustion chamber in sequence so that each sample enters said chamber when said chamber is ready for a new sample; (c) means for collecting from said combustion chamber combustion product resulting from the combustion of each sample and retaining said product in a liquid scintillator to provide at least one test sample corresponding to each radioactive sample combusted; and (d) a detecting means communicating with said collecting means, receiving and counting said test samples, said means for collecting said combustion product from said combustion chamber trapping said combustion product in a liquid scintillator as said combustion product is formed.

7. A liquid scintillation detection system comprising a chamber for containing a liquid scintillation test sample, means for delivering by fluid flow a plurality of radioactive liquid scintillation test samples in sequence into said chamber, and means to detect the scintillations occurring in the test sample contained by said chamber.

8. A liquid scintillation detection system as recited in claim 7, further comprising means to produce said radioactive liquid scintillation test samples in sequence to be delivered into said chamber in sequence.

9. A liquid scintillation detection system as recited in claim 8 wherein said means to produce said radioactive liquid scintillation samples comprises means to combust radioactive samples and trap the resulting combustion product in a liquid scintillator.

10. A method of liquid scintillation counting comprising the steps of (a) sequentially conveying radioactive samples to a combustion zone, said conveying being carried out automatically so that a new sample is introduced into said combustion zone only after combustion product from a previous sample has been completely removed from said zone; (b) combusting said sample in said combustion zone to produce volatile isotope oxide combustion product; (c) exhausting said product from said combustion zone and collecting and trapping said product in a scintillator to produce discrete liquid test samples, one for each of said radioactive samples; (d) delivering said test samples by fluid flow in discrete form maintained separate from one another into a detecting zone wherein the radioactivity of each of said test samples is counted.

11. A method of liquid scintillation counting as recited in claim 10 wherein samples are conveyed maintained substantially aligned and spaced from one another so as to be successively transported to a predetermined point in communication with a combustion zone.

12. A method of liquid scintillation counting as recited in claim 11 wherein radioactive samples are conveyed having been encapsulated with a combustible material.

13. A method of liquid scintillation counting as recited in claim 10 wherein a radioactive sample contains both $^3H$ and $^{14}C$ and oxides of these isotopes are produced as a result of step (b).

14. The method of liquid scintillation counting as recited in claim 13 wherein oxide of $^3H$ and oxide of $^{14}C$ are separately collected and trapped to provide two separate test samples.

15. A method of liquid scintillation counting as recited in claim 14 wherein the tritium oxide containing test sample is caused to flow into one of two holding zones which has been washed of residual radioactivity from the previous test sample which it contained.

16. A method of liquid scintillation counting as recited in claim 15 wherein the washing is carried out with toluene.

17. A method of liquid scintillation counting as recited in claim 15 wherein said test sample is drawn by suction from a holding zone to a detecting zone wherein tritium is counted.

18. A method of liquid scintillation counting as recited in claim 14 wherein the $^{14}CO_2$ containing test sample is caused to flow into one of two holding zones which has been washed of residual radioactivity from the previous test sample which it contained.

19. A method of liquid scintillation counting as recited in claim 18 wherein the washing is carried out with toluene.

20. A method of liquid scintillation counting as recited in claim 18 wherein said test sample is drawn by suction from a holding zone to a detecting zone wherein carbon-14 is counted.

21. A method of liquid scintillation counting as recited in claim 14 wherein the two separate test samples are separately counted.

22. A method of liquid scintillation counting as recited in claim 13 wherein said oxides from each sample are concurrently collected and trapped to provide a single test sample.

23. A method of liquid scintillation counting as recited in claim 22 wherein the test sample is caused to flow into one of two holding zones which has been washed of residual radioactivity from the previous test sample which it contained.

24. A method of liquid scintillation counting as recited in claim 23 wherein washing is carried out with toluene.

25. A method of liquid scintillation counting as recited in claim 23 wherein a test sample is drawn by suction from a holding zone to a detecting zone wherein both carbon-14 and tritium are concurrently counted.

26. A method of liquid scintillation counting as recited in claim 10 wherein a test sample is caused to flow into one of two holding zones which have been washed of residual radioactivity from the previous test sample which it contained.

27. A method of liquid scintillation counting as recited in claim 26 wherein washing is carried out with toluene.

28. A method of liquid scintillation counting as recited in claim 26 wherein a test sample is drawn by suction from a holding zone to a detecting zone.

29. A method of liquid scintillation counting as recited in claim 10 wherein a test sample is drawn by suction into a detecting zone.

30. A method of liquid scintillation counting as recited in claim 10 wherein oxygen is fed into said combustion zone in step (b) resulting in combustion product containing excess oxygen some of which is retained in said test sample.

31. A method of liquid scintillation counting as recited in claim 30 wherein said retained oxygen is purged from said test sample.

32. A method of liquid scintillation counting as recited in claim 31 wherein purging is carried out with nitrogen.

33. A method of liquid scintillation counting as recited in claim 10 wherein said combustion product is trapped in said scintillator as said combustion product is formed.

34. A liquid scintillation counting system comprising automatic means to receive combustible samples containing radioactive isotopes sequentially and to automatically combust the samples as they are received and trap the resulting combustion product in scintillators to provide test samples, means to convey combustible samples to said automatic means in sequence, and detecting means to detect the type of each sample conveyed in sequence to said automatic means and to signal said automatic means the type of sample conveyed thereto, said automatic means varying its operation in accordance with the signal received from said detecting means.

35. A liquid scintillation counting system as recited in claim 34 wherein said automatic means traps the combustion product produced from the combustion of a combustible sample in a first scintillator in response to a signal from said detecting means indicating that the combustible sample is of a first type and traps the combustible product in a second scintillator in response to a signal from said detecting means indicating that the sample is of a second type.

36. A liquid scintillation counting system as recited in claim 35 wherein said automatic means traps the combustion product from a combusted sample in said first and second scintillators in response to a signal from said detecting means indicating that said sample is of a third type.

37. A liquid scintillation counting system as recited in claim 34 wherein said automatic means includes means to count the scintillations produced in each test sample produced from the combustion of each of said combustible samples.

* * * * *